(12) United States Patent (10) Patent No.: US 7,649,890 B2
Mizutani et al. (45) Date of Patent: Jan. 19, 2010

(54) PACKET FORWARDING APPARATUS AND COMMUNICATION BANDWIDTH CONTROL METHOD

(75) Inventors: Masahiko Mizutani, Kokubunji (JP); Masayuki Hino, Yokohama (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 723 days.

(21) Appl. No.: 11/211,589

(22) Filed: Aug. 26, 2005

(65) Prior Publication Data

US 2006/0187942 A1 Aug. 24, 2006

(30) Foreign Application Priority Data

Feb. 22, 2005 (JP) ............................. 2005-045108

(51) Int. Cl.
*H04L 12/28* (2006.01)
*H04L 12/56* (2006.01)
*H04J 3/16* (2006.01)
*H04J 3/22* (2006.01)

(52) U.S. Cl. ..................... 370/395.21; 370/395.41; 370/468

(58) Field of Classification Search ............... 370/229, 370/230, 230.1, 235, 330, 333, 395.21, 395.41, 370/468, 477
See application file for complete search history.

(56) References Cited

U.S. PATENT DOCUMENTS

| | | | | |
|---|---|---|---|---|
| 6,590,865 | B1 * | 7/2003 | Ibaraki et al. | 370/230 |
| 6,717,944 | B1 * | 4/2004 | Bryden et al. | 370/392 |
| 7,069,009 | B2 * | 6/2006 | Li et al. | 455/446 |
| 7,197,044 | B1 * | 3/2007 | Kadambi et al. | 370/418 |
| 2002/0176414 | A1 * | 11/2002 | Miki et al. | 370/389 |
| 2002/0176427 | A1 * | 11/2002 | Noda et al. | 370/401 |
| 2004/0052248 | A1 * | 3/2004 | Frank et al. | 370/352 |
| 2005/0260997 | A1 * | 11/2005 | Korale et al. | 455/452.2 |

FOREIGN PATENT DOCUMENTS

| | | |
|---|---|---|
| JP | 2001-308935 | 11/2001 |
| JP | 2002-158698 | 5/2002 |
| JP | 2002-354015 | 12/2002 |

* cited by examiner

*Primary Examiner*—Chirag G Shah
*Assistant Examiner*—Ashley L Shivers
(74) *Attorney, Agent, or Firm*—Stites & Harbison PLLC; Juan Carlos A. Marquez, Esq.

(57) ABSTRACT

In a network for forwarding user packets by a tunneling protocol, an egress edge node to which tunnels concentrate from a plurality of ingress edge nodes allocates a bandwidth to each of sessions multiplexed through each of the tunnels and notifies each of the ingress edge nodes of the allocated bandwidth, and the ingress node notifies private routers or terminal devices of the allocated bandwidth.

20 Claims, 20 Drawing Sheets

SESSION MANAGEMENT TABLE 400

| SESSION ID | TYPE OF SERVICE (SERVICE ID) | PRIORITY POINTS | ALLOCATED BANDWIDTH |
|---|---|---|---|
| 1 | Web | 20 | |
| 2 | VoIP | 105 | |
| 3 | P2P | 12 | |
| ... | | | |

CONTROL POLICY TABLE 500

| USER ID \ TYPE OF SERVICE | IMPORTANCE POINTS | VoIP | TV | Web | P2P | ...... |
|---|---|---|---|---|---|---|
| USER 1 | 10 | 100 | 50 | 10 | 2 | |
| USER 2 | 5 | 110 | 60 | 20 | 12 | |
| ... | | 105 | 55 | 15 | 7 | |

FIG. 5

FLAG TABLE 600

| TUNNEL ID 601 | SESSION ID 602 | USER ID 603 | BANDWIDTH ALLOCATION COMPLETION FLAG 604 |
|---|---|---|---|
| 1 | 1 | abcd... | 1 |
| 1 | 2 | efgh... | 0 |
| ... | ... | ... | ... |

*FIG. 14*

PORT NUMBER/TYPE OF SERVICE CONVERSION TABLE 610

| DESTINATION PORT NUMBER 611 | TYPE OF SERVICE 612 |
|---|---|
| 80 | Web |
| 8080 | Web |
| ... | ... |

COMMUNICATION STATE MANAGEMENT TABLE 700

| TUNNEL ID | NUMBER OF SESSIONS | ALLOCATED BANDWIDTH (Mbps) |
|---|---|---|
| 1 | 20 | 1000 |
| 2 | 50 | 2500 |
| 3 | 30 | 1500 |
| ...... | ...... | ...... |

| TUNNEL ID | NUMBER OF SESSIONS | TOTAL POINTS OF SERVICE IMPORTANCE | ALLOCATED BANDWIDTH (Mbps) |
|---|---|---|---|
| 1 | 20 | 92 | 1000 |
| 2 | 50 | 246 | 2500 |
| 3 | 30 | 128 | 1500 |
| ...... | ...... | ...... | ...... |

TUNNEL/SESSION MANAGEMENT TABLE 800

| TUNNEL ID 801 | MAXIMUM AVAILABLE BANDWIDTH 802 | SESSION ID 803 | TYPE OF SERVICE 804 | PRIORITY POINTS 805 | ALLOCATED BANDWIDTH 806 |
|---|---|---|---|---|---|
| 1 | 3000Mbps | 1 | VoIP | 50 | 1000Mbps |
|   |   | 2 | Web | 10 | 200 |
|   |   | 3 | P2P | 5 | 100 |
| 2 | 1500 | 1 | P2P | 5 | 500 |
|   |   | 2 | Web | 10 | 1000 |
| 3 | 2000 | 1 | VoIP | 50 | 1000 |
|   |   | 2 | TV | 30 | 600 |

PACKET FORWARDING APPARATUS AND COMMUNICATION BANDWIDTH CONTROL METHOD

CLAIM OF PRIORITY

The present application claims priority from Japanese application serial No. 2005-045108, filed on Feb. 22, 2005, the content of which is hereby incorporated by reference into this application.

BACKGROUND OF THE INVENTION (1) Field of the Invention

The present invention relates to a packet forwarding apparatus and a communication bandwidth control method and, more particularly, to a packet forwarding apparatus and a communication bandwidth control method suitable for communication quality assurance for packets transmitted over a network comprising a plurality of nodes.

(2) Description of Related Art

Improvement of computer-based communications environment is evolving. Internet Protocol (IP) that is used worldwide is a communication protocol for a network layer of the OSI reference model. According to the IP, IP addresses are assigned to the line interfaces of apparatuses as terminals and relay nodes and each apparatus is identified by an IP address. Normally, a network is set up for each autonomous system (AS) as a unit of management and, by interconnecting networks of management units, a broad worldwide network is configured.

Communication services that are available on infrastructures offered by carriers, namely, Internet Service Providers (ISPs) can be roughly divided into line provision service oriented to corporate users and ISP's connection service oriented to personal users. A major part of the line provision service for corporate users is shifting from the conventional service using leased lines such as, for example, Asynchronous Transfer Mode (ATM) networks and frame relay networks, to the service using Virtual Private Networks (VPNs) on IP networks, which is more advantageous in cost. On the other hand, as for the network connection service for personal users, with expanded bandwidth by the advance of Digital Subscriber Line (DSL) technology typified by Asymmetric Digital Subscriber Line (ADSL), both data transfer capacity and the quantity of users rise drastically. With the proliferation of Fiber to The Home (FTTH), the network environment is being developed to serve as a basis for the life of personal users.

For the above networking services for corporate and personal users, a packet forwarding service between user sites, for example, a user terminal to a user terminal or a user terminal to a server, goes mainstream. In a packet forwarding network, a packet forwarding technique termed tunneling is used. The tunneling means a mechanism of adding (encapsulation) another header called as an encapsulation header to a received IP packet and forwarding the packet based on information specified in the encapsulation header. The tunneling is a communications technique effective for an ISP network that provides a service using its infrastructure to transport a data packet received from an external network to another external network.

There is an expanding demand for transit network infrastructures that interconnect networks, such as a service of providing a Multi Protocol Label Switching (MPLS) network, which is called IP-VPN, a site-to-site packet delivery service using IP security (IPsec) provided to small and medium sites, and a remote access service. Wide Area Ethernet service which has lately attracted attention is a similar technique for data packet forwarding between a plurality of LANs.

To access an Internet network, a general user must subscribe to a provider (ISP) of network/line services and acquire a subscriber right to use a line. Normally, a user connects a terminal device at home to the network of the ISP to which the user subscribed and connection to another ISP's network or a corporate network is made via this network.

In general, an access network owned by an access line provider lies between a user terminal and the ISP to which the user subscribed. A node on the access network forwards data packets received from the user terminal to the ISP network by tunneling. As tunneling protocols, for example, Layer 2 Tunneling Protocol (L2TP), Virtual LAN (VLAN), IP security (IPsec), and Multi Protocol Label Switching (MPLS) can be used.

In IP networks, various kinds of multimedia data services are implemented. Traffic over IP networks is increasing year by year, particularly due to an increasing number of users of a file exchange service and a chat service by direct communication between terminals, which is called Peer to Peer (P2P), and large-volume content distribution like Video on Demand (VoD) coming into popular use. Also, there is an increasing demand for services requiring information transfer in real time, such as IP telephone service and TV conference service. In this situation, for example, traffic duration, the amount of transmission data changing with time, and the required quality of communication differ from one service to another. Consequently, if the above-mentioned diversified types of information are delivered across a single network, conventional communication control techniques that handle all data packets uniformly cannot accommodate the demands of services that users wish for.

SUMMARY OF THE INVENTION

In general, packet forwarding devices such as routers and packet switches are provided with a Quality of Service (QoS) function that determines a priority level of processing a packet to forward based on header information attached to the packet received. QoS is implemented in conjunction with a policing function to regulate traffic of arrived packets to a reserved bandwidth, a marker function to set a priority level of received packets, and a function of queuing/dequeuing packets according the priority level. Setting parameters required for these functions must be done for each packet forwarding apparatus. However, because policies and parameters set for QoS differ for different packet forwarding apparatuses or network managers, it is difficult to keep a consistent quality of communication across all sections of a packet routing path.

One method for solving the above problem is, for example, Traffic Engineering (TE) using MPLS. In the TE, a path along which packets are routed to a destination can be specified. Resource Reservation Protocol (RSVP)-TE is well known as the TE in which a bandwidth is allocated for each section on the path sequentially for QoS control. However, traffic conditions in a network frequently change over time and a QoS level, which was set when a session is initiated, is not always maintained until the end of a packet flow and, thus, the RSVP-TE does not assure practically sufficient QoS control. Because a communication bandwidth required for QoS is allocated for each section in order from the upstream of the packet path, there is a possibility of selecting an alternate route which becomes useless in terms of result, according to traffic conditions of en route sections, or a possibility that the intended path cannot be ensured because of bandwidth shortage at en route on the path. A problem associated with this method is that the bandwidth thus allocated for a particular packet flow is monopolized by this packet flow until the end of the communication and this decreases the efficiency of network utilization.

In the circumstances where services are diversified, it is required to set QoS fit for each user and each service. Such QoS control can be implemented on a per-device basis by a hierarchical shaping technology that is armed in a router or the like. In ATM routing control, hierarchical traffic control using VPI and VCI can be performed. However, hierarchical shaping on a per-network basis across a plurality of forwarding devices is impossible as of now. Diffserv is only an approach that can implement flow-by-flow QoS control on the network level. However, to convey QoS level notification from one device to another, it is only a method to use a TOS field of a packet header, and the number of QoS levels that can be set is limited.

An object of the present invention is to provide a packet forwarding apparatus and a communication bandwidth control method capable of forwarding packets through sections in a network providing diversified services of communication without failing to satisfy requirements for each service across the sections.

To achieve the above object, according to the present invention, an egress edge node to which tunnels concentrate from a plurality of ingress edge nodes allocates a bandwidth to each of sessions multiplexed through each of the tunnels and notifies each of the ingress edge nodes of the allocated bandwidth, and the ingress node notifies private routers or terminal devices of the allocated bandwidth.

More specifically, a packet forwarding apparatus according to the present invention is connected to a plurality of communication nodes via a first network for communicating packets encapsulated by a tunneling protocol with the communication nodes and forwarding the packets received from the first network to a second network after decapsulating the packets. The packet forwarding apparatus is comprised of:

a plurality of input line interface modules connected to input lines from the first or second network, a plurality of output line interface modules connected to output lines to the first or second network, a controller, and a packet forwarding unit for interconnecting the controller, the input line interface modules, and the output line interface modules, wherein the controller determines a bandwidth to be allocated to each of sessions multiplexed through a tunnel established between the packet forwarding apparatus and one of the communication nodes according to a type of communication service to be offered to user packets, and notifies the communication node associated with the session of the allocated bandwidth.

More particularly, in the packet forwarding apparatus of the present invention, the controller has a session management table for storing, for each of tunnels formed between the packet forwarding apparatus and the communication nodes, bandwidths allocated to the sessions multiplexed through the tunnel, and determines whether a bandwidth can be allocated to a new session by referring to the session management table.

One feature of the present invention resides in that the controller obtains priority information determined by a combination of user identifier and type of communication service for each session from a user management server with which the controller is connected through a pair of input and output line interface modules connected to the packet forwarding unit, and modifies a bandwidth to be allocated to a new session according to the priority information.

In the user management server, for example, a policy table is prepared in which priority points for each user assigned to each user when the user subscribed to a communication service, and priority points for each service which differ by the type of communication service are defined. When a user identifier and a type of communication service are designated, the user management server specifies priority points determined in accordance with the combination of the priority points for each user and the priority points for each service by referring to the policy table. Thus, it is possible to allocate a bandwidth to each session reflecting contract terms for each user.

Another feature of the present invention resides in that the controller obtains priority information determined in accordance with a combination of user identifier and type of communication service for each session from the user management server with which the controller is connected through a pair of input and output line interface modules connected to said packet forwarding unit, stores the priority information in association with a session identifier into the session management table, and procures a necessary free bandwidth to be allocated to a new session, if free bandwidth on an output line of said second network is less than the bandwidth determined according to the type of communication service, by adjusting the bandwidths having been allocated to existing sessions specified in said session management table according to the priority information.

In one embodiment of the present invention, when a new session is set up, the controller determines the bandwidth to be allocated to the new session according to type of communication service to be offered to user packets, and notifies the communication node associated with the session of the allocated bandwidth, prior to transmission of user packets through the session. In this case, the controller obtains a user identifier and a type of communication service, which are necessary to determine the priority information, from the communication node that is a requester of the session set up.

In another embodiment of the present invention, when the first user packet was received through a new session, the controller determines the bandwidth to be allocated to the new session according to the type of communication service to be offered through the new session, and notifies the communication node associated with the new session of the allocated bandwidth.

The present invention also resides in a communication bandwidth control method in a communication network including a first communication node connected to a plurality of user terminals via a user network and a plurality of second communication nodes each of which is connected to an Internet Service Provider (ISP) network, the first communication node communicating packets encapsulated by a tunneling protocol with each of the second communication nodes, wherein each of the second communication nodes determines a maximum bandwidth available for a tunnel established between the first communication node and the second communication node according to the bandwidth of a line connected to said ISP network and notifies the first communication node of the maximum bandwidth of the tunnel; and the first communication node allocates a bandwidth to each of sessions multiplexed through the tunnel within the limits of the maximum bandwidth and controls the bandwidth of user packets for each session. In this case, the first communication node allocates a bandwidth to each session according to the type of communication service to be offered to user packets.

In one embodiment of the present invention, the first communication node is provided with a management table comprising a plurality of entries, each of which includes, in association with a tunnel identifier, a maximum bandwidth of a tunnel allocated by the second communication node and a plurality of session information records each indicating a session identifier, a type of communication service and a bandwidth allocated to the session, and the first communication node allocates a bandwidth to each session according to type of communication service to be offered to user packets, by referring to said management table.

One feature of the present invention resides in that each of the second communication nodes obtains priority information determined in accordance with a combination of a user identifier and a type of communication service for each session from a user management server located in the ISP network and notifies the first communication node of the priority information, and the first communication node modifies a bandwidth to be allocated to a new session according to the priority information notified from the second communication node.

In the preferable embodiment, the first communication node stores the priority information notified from said second communication node in association with a session identifier into said management table and procures a necessary free bandwidth to be allocated to a new session if free bandwidth of the tunnel is less than the bandwidth determined according to the type of communication service, by adjusting the bandwidths having been allocated to the existing sessions specified in said management table according to the priority information, thereby enabling the allocation of a necessary free bandwidth to the new session.

According to the present invention, traffic across the tunnel can be controlled in a network section for forwarding packets by tunneling protocol, reflecting line capacity at the egress of the channel. Thus, it is unnecessary to share a QoS level across a plurality of forwarding apparatus units. In some implementation adopting such a control policy that determines the priority of each session in accordance with a combination of a plurality of categories, namely, priority for each user and priority for each service, traffic control meeting user need can be realized by modifying the bandwidth determined by the type of communication service in accordance with the above priority.

BRIEF DESCRIPTION OF THE DRAWINGS

FIG. 4 shows an example of a session management table provided in a LAC and a LNS.

FIG. 5 shows an example of a control policy table provided in a user management server.

FIG. 14 shows an example of a flag table provided in a LNS in the second embodiment.

FIG. 15 shows an example of a port number/type of service conversion table provided in a LNS in the second embodiment.

FIG. 16A and FIG. 16B show examples of a communication status management table provided in a LNS in a third embodiment of the present invention.

FIG. 17 shows an example of a tunnel/session management table provided in a LAC in the third embodiment.

DETAILED DESCRIPTION OF THE PREFERRED EMBODIMENTS

Figure 1:
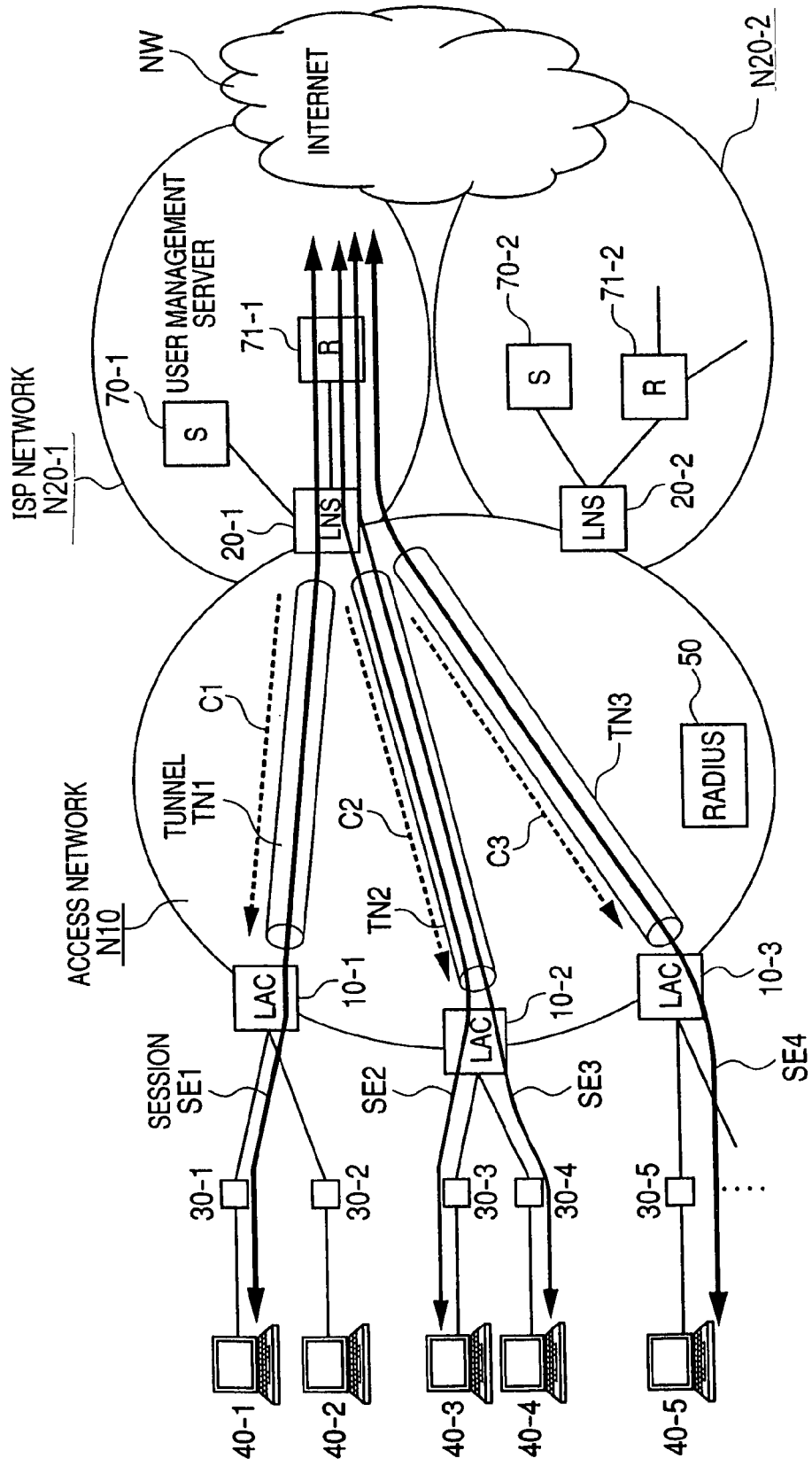
FIG. 1 is a diagram to explain an example of architecture and operation of an access network to which the present invention is applied.

Basic embodiments of the present invention will now be described by referring to the drawings.

FIG. 1 shows an example of architecture of an access network to which packet forwarding apparatuses of the present invention are applied.

The access network N10 takes a role of connecting user terminals 40 (40-1 to 40-m) to networks N20 (N20-1 and N20-2) of Internet Service Providers (ISP) for network connection service to which the users subscribed. The networks N20 (N20-1 and N20-2) will hereinafter be referred to as ISP networks. The user terminals are connected to the access network N10 via private routers 30 (30-1 to 30-n) supplied from the access network provider or the ISPs.

The private routers 30 are connected to packet forwarding apparatuses 10 (10-1 to 10-3), which are called L2TP Access Concentrators (LACs) to be ingress edge nodes of the access network N10 through connection lines, which may be, for example, Digital Subscriber Lines (DSLs) or optical fibers. The access network N10 is connected to the ISP networks N20 (N20-1 and N20-2) by packet forwarding apparatuses 20 (20-1 and 20-2), which are called L2TP Network Servers (LNSs) to be egress edge nodes of the access network N10.

The access network N10 is comprised of the LACs 10, LNSs 20, a plurality of packet forwarding apparatuses (routers) not shown, an authentication (RADIUS) server 50, and other servers. The authentication server 50 performs a process of authenticating a user terminal 40 and its private router 30 that issued a request for connection to the access network N10 and a process of determining an ISP network to which the user terminal 40 should be connected.

The LNSs 20 perform user authentication in conjunction with user management servers 70 (70-1 and 70-2) respectively situated in the ISP networks to connected subscriber user terminals 40 to the ISP networks N20. A user terminal authorized for connection to an ISP network 20 by one of the LNSs 20 is connected to the Internet NW via one of routers 71 (71-1 and 71-2) situated in the ISP network 20 and it can get various kinds of information services offered by Web servers or can communicate with another user terminal via the Internet NW.

In the network architecture shown in FIG. 1, the correspondence of the user terminals 40-1 to 40-m (private routers 30-1 to 30-n) to the LACs 10-1 to 10-3 are determined by the address assigned to each user and an area covered by a local station node (LAC) that accommodates communication lines in that area. When a user terminal 40 is connected to its local LAC 10 through a private router 30, the LAC 10 sends to the authentication server 50 a query for identification information of a LNS 20 to which next-hop connection should be made and sets up a session with the particular LNS notified from the authentication server 50. At this time, which LNS 20 the LAC 10 should connect to is identified by connection/authentication information such as user ID and ISP name associated with the user terminal that is notified from the private router 30 to the LAC 10.

Usually a plurality of LACs is connectable to each LNS 20 in n-to-one correspondence as shown in FIG. 1. After performing a session setup procedure with a LAC 10, each LNS 20 receives a connection request including user authentication information from the LAC 10, and authenticates the requesting user in conjunction with the user management server 70 (70-1 or 70-2). When succeeded in user authentication, the user terminal obtains an IP address from the LNS 20, whereby the user terminal can access the Internet NW by using the IP address.

Each tunnel connection in the access network N10 can be established for any combination of a LAC 10 and a LNS 20. Within the access network N10, each of data packets transmitted from the user terminals 40 is forwarded, in the form of a packet encapsulated with an encapsulation header defined by an OSI Reference Model Layer 2 protocol without regard to the contents of the packet, to one of the LNSs 20 corresponding to the destination ISP networks N20-j (j=1 or 2). In the access network N10, it is thus possible to carry out encapsulation and routing control of received packet by using an addressing scheme and a protocol selected at the discretion of the access network provider.

A technique of encapsulating and forwarding received packets is termed "tunneling" and, typically, a Layer 2 Tunnel Protocol (L2TP) is applied to the access network N10. In the L2TP, the correspondence between one LAC 10 and one LNS 20 is determined for each session and user packets encapsulated in the L2TP packet format are communicated between the LAC and the LNS. The L2TP header includes a tunnel identifier and a session identifier.

Usually, a plurality of LACs 10 sets up tunnels TNs to one LNS 20 as shown by TN-1 to TN-3 in FIG. 1. Each LAC 10 has connections to a plurality of user terminals (private routers) in its area and the LAC 10 multiplexes sessions from the user terminals through a tunnel corresponding to a destination ISP network. Thus, the connections from the plurality of LACs 10 concentrate on each LNS 20 and, consequently, each LNS 20 has to process a greater number of packets than a LAC does.

In the example shown in FIG. 1, a session SE1 from a user terminal 40-1 is set up through a tunnel TN 1 established between the LAC 10-1 and the LNS 20-1, sessions SE2 and SE3 from user terminals 40-3 and 40-4 are set up through a tunnel TN2 established between the LAC 10-2 and the LNS 20-1, and a session SE4 from a user terminal 40-5 is set up through a tunnel TN3 established between the LAC 10-3 and the LNS 20-1. As exemplified by the sessions SE2 and SE3 through the tunnel TN2, once a LAC-to-LNS tunnel TN has been established, new sessions can be multiplexed and accommodated through the same tunnel.

Figure 2:
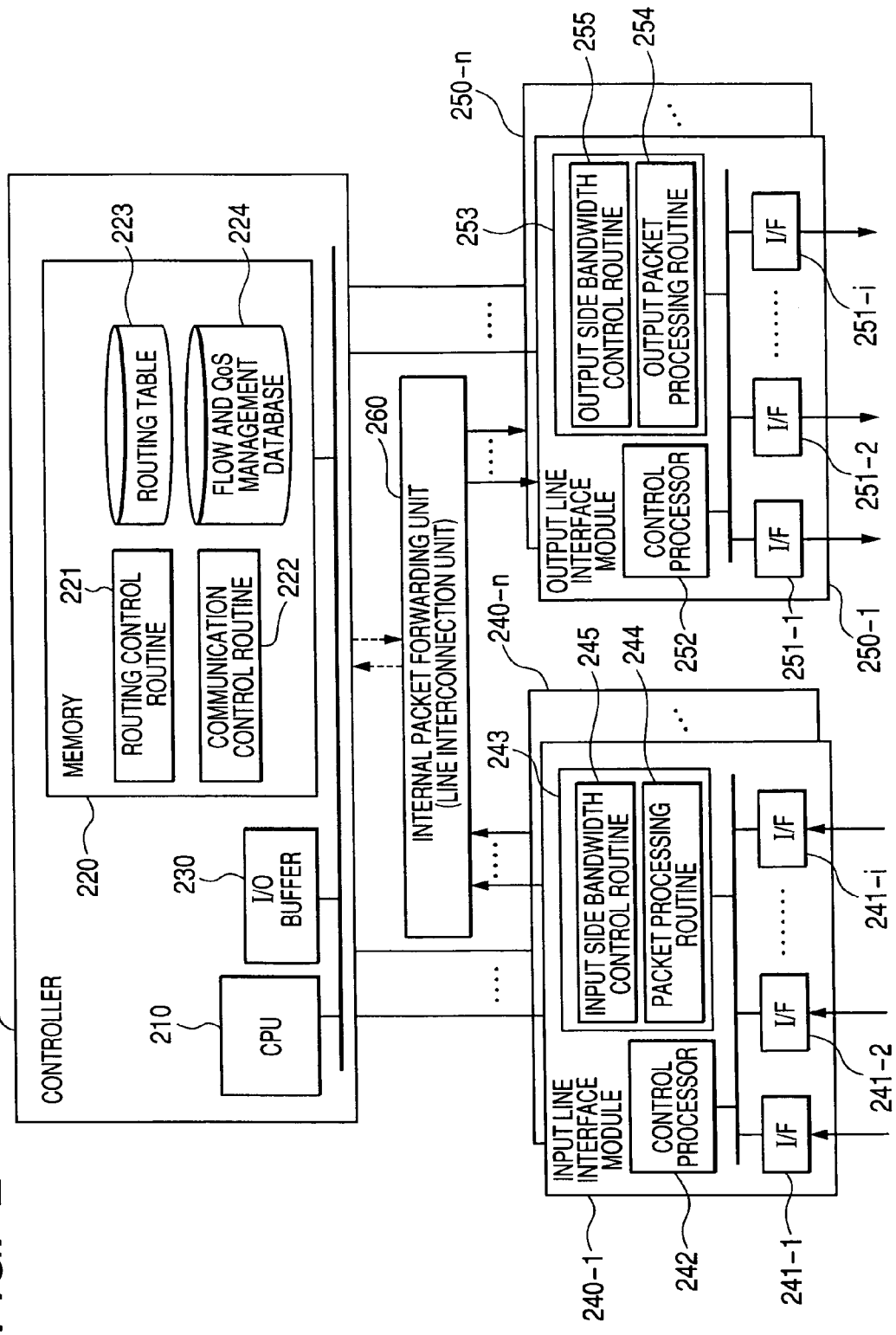
FIG. 2 is a diagram showing an example of an apparatus configuration of a LNS shown in FIG. 1.

FIG. 2 shows an example of an apparatus configuration of a LNS 20 shown in FIG. 1. A LAC 10 is basically constructed in the same configuration as shown in FIG. 2, but software to be installed therein differs from that for the LNS. Thus, detailed description of the LAC 10 configuration is omitted and reference numbers assigned to the components in FIG. 2 will be cited in the description of LAC operation, if necessary.

The LNS 20 is comprised of a controller 200, a plurality of input line interface modules 240-1 to 240-n each including a plurality of input line interfaces (I/Fs) 241-1 to 241-i, a plurality of output line interface modules 250-1 to 250-n each including a plurality of output line interfaces 251-1 to 251-i, and an internal packet forwarding unit (line interconnection unit) 260 which makes connections between these input line interface modules 240 (240-1 to 240-n) and output line interface modules 250 (250-1 to 250-n). The line interconnection unit 260 can be comprised of, for example, a high-speed bus or variable-length packet switch. The controller 200 is comprised of a processor (CPU) 210, a memory 220, and an I/O buffer connected to the line interconnection unit 260.

The memory 220 includes a routing control routine 211 and a communication control routine 222 as programs relating to the present invention, which are executed by the CPU 210. A routing table 223 managed by the routing control routine 211 and a flow and QoS management database (DB) 224 to be accessed by the communication control routine 222 are also prepared in the memory 220. The flow and QoS management database 224 includes various type of tables, such as a conversion table to be referred to based on priority points when a bandwidth is allocated to a session, and a session management table indicating sets of related attributes including session ID, type of service, and allocated bandwidth. These tables will be detailed hereinafter.

The routing control routine 211 manages the routing table 223 according to a routing protocol and updates the contents of routing table to be referred to by each input line interface module 240 for the sake of routing the received packets. The communication control routine 222 is executed to manage the communication status of each session being established and to manage bandwidth allocation to each session and bandwidth use status according to preset control policies and the traffic status of each communication line within the access network.

One feature of the present invention resides in that the LNS 20 determines priority points of each connection in accordance with the combination of user ID and type of communication service and controls bandwidth allocation to each connection according to the priority points. A relation among user ID, type of service, and priority points is defined in a control policy table. However, to reduce the load on the LNS 20, the control policy table may be located on the management server 70 linked to each LNS and the LNS may obtain priority points of a connection from the management server 70, using a client authentication function to associate with the management server. The client authentication function is provided in the communication control routine 222.

Each input line interface module 240 (240-1 to 240-*n*) includes a control processor 242 connected to input line interfaces 241 through an internal bus, a memory 243, an interface for connecting with the line interconnection unit 260, and an interface for connecting with the controller 200, wherein the latter two interfaces are omitted from FIG. 2 for simplification. The memory 243 includes a routing table and other tables and, includes, as programs to be executed by the control processor 242, a packet processing routine 244 for fetching a received packet from each of the input line interface and performing protocol processing based on the header information of the received packet, and an input-side bandwidth control routine 245 for managing the traffic status for each input line and adjusts the rate of receiving packets, if necessary.

For an encapsulated packet received from the access network N10, it can be distinguished whether it is a control packet or a user packet in accordance with the value of the first bit (T bit) of the L2TP header. If a control packet is received, the packet processing routine 244 adds an internal address indicating the ID number of the controller 200 to the packet and outputs the received packet to the line interconnection unit 260. If a user packet is received, the packet processing routine 244 eliminates the encapsulation header from the user packet, refers to the routing table based on the destination IP address specified in the IP header, and outputs the user packet to the line interconnection unit 260 in the form of an internal packet with an internal address indicating the ID number of an output interface specified by the routing table.

Each output line interface module 250 (250-1 to 250-*n*) includes a control processor 252 connected to output line interfaces 251 through an internal bus, a memory 253, an interface for connecting with the line interconnection unit 260, and an interface for connecting with the controller 200, wherein the latter two interfaces are also omitted from FIG. 1 for simplification. The memory 253 includes, as programs to be executed by the control processor 252, an output packet processing routine 254 for performing header processing and protocol processing on output packets and forwarding the output packets to the output line interfaces 251, and an output-side bandwidth control routine 255 for controlling the rate of transmission packets for each session based on a communication control table prepared in the memory 253.

The memory 253 also includes a communication control table which is necessary to encapsulate a packet received from an ISP network according to the destination address and forward the packet to a LAC 10 through a session.

Figure 3:
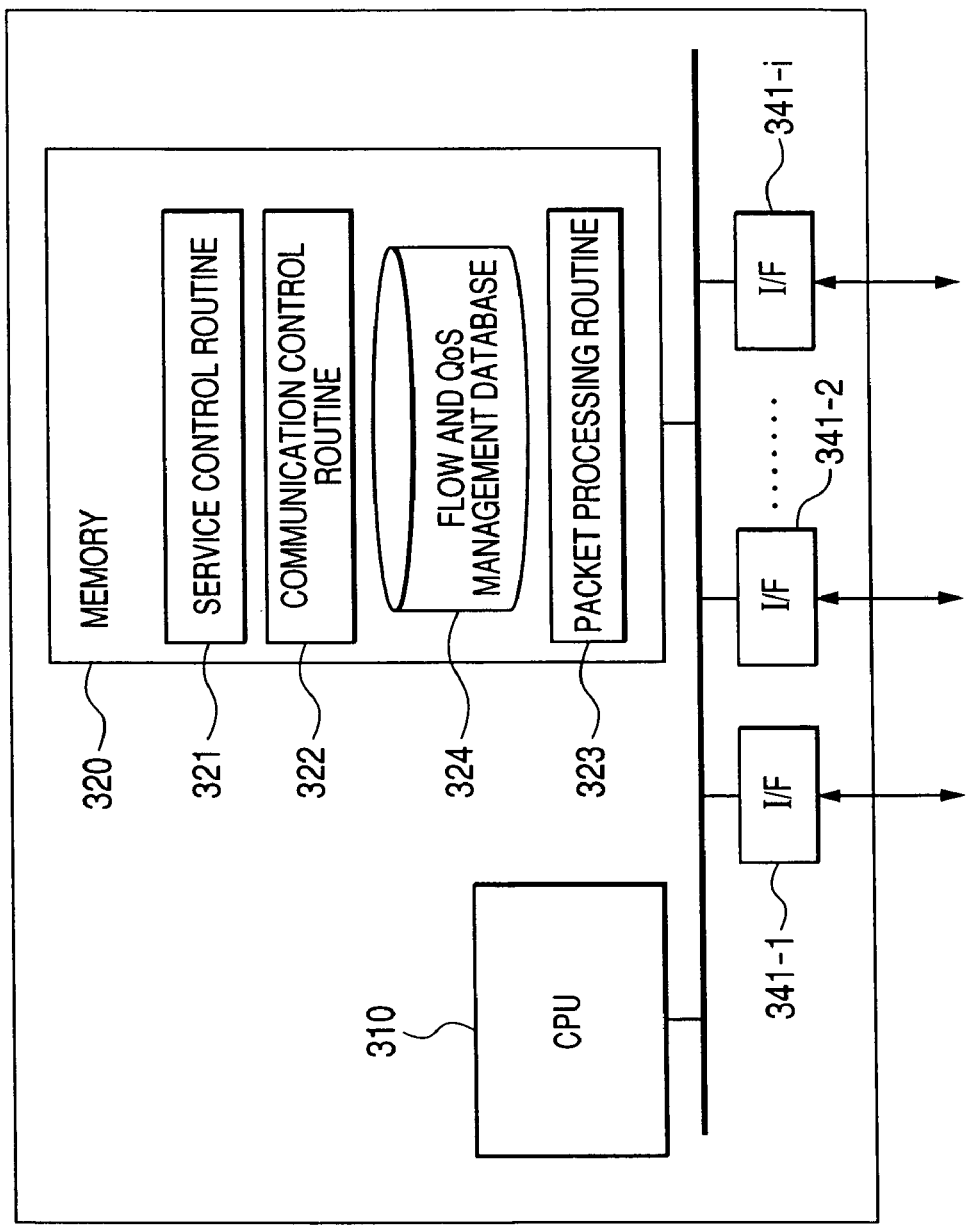
FIG. 3 is a diagram showing an example of an apparatus configuration of a private router shown in FIG. 1.

FIG. 3 shows an example of a configuration of a private router 30. The private router 30 is comprised of a processor (CPU) 310, a memory 320, and a plurality of line interface units 341-1 to 341-*i* for accommodating connection lines connected to user terminals or a LAC. The memory 320 includes, as programs to be executed by the CPU 310, a service control routine 321 for generating packets according to the type of communication service to be provided to the user when communication with a user terminal is initiated and performing other processing, a communication control routine 322 for performing communication status management and communication bandwidth control, and a packet processing routine 323 for communicating packets with the line interface units 341 and performing protocol processing based on the header information of each packet. The memory 320 also includes a flow and QoS management database 324 to be accessed by the communication control routine 322.

FIG. 4 shows an example of a structure of a session management table prepared in the flow and QoS management databases 224, which is provided in a LAC 10 and a LNS 20 operating as edge nodes of a packet forwarding section.

The session management table 400 includes a plurality of entries each corresponding to an identifier (ID) of session 401 being used for communication. Each entry indicates type of service (service ID) 402, priority points 403 assigned to the session, and allocated bandwidth 404. The type of service 402 is reflected to a control policy that determines priority points of each session as will be described later. The priority points 403 indicate a value of priority assigned to each session according to the control policy. The session management table 400 is prepared for each tunnel ID and referred to as control information of a plurality of sessions in the same tunnel.

FIG. 5 shows an example of a control policy table 500.

The control policy table shown here is prepared to search for priority points corresponding to a control policy value with a search key of a combination of user ID and type of service. This table is made up of rows of user IDs 501 and columns of types of service 503. A value of priority points depending on the control policy is defined in every cell specified by the combination of a user ID 501 and a type of service 503. The value of priority points is the sum of a value of importance points 502 for each user pre-assigned to each user ID 501 and a value of importance points 504 for each service pre-assigned to each type of service 503.

In the example shown here, as values of importance points 504 for each service, a highest value of "100" is assigned to telephone (VoIP) 503-1, a next highest value of "50" to TV 503-2, and "10 and "2" to Web 503-3 and P2P (Peer to Peer) 503-4, respectively. The importance points 502 for each user indicate service importance factors (weight points) that the ISP assigns to the subscriber users.

According to this embodiment, when a limited bandwidth has to be shared among a plurality of sessions, it is possible to set a bandwidth for each session, taking account of both importance for each service and importance for each user, by allocating the shares of the bandwidth according to the above priority points 505. Further, by allocating to each session a basic minimum assured bandwidth determined in accordance with the service type and making a modification to the minimum assured bandwidth so as to add a bandwidth determined depending on the priority points 505 (or importance points 502 for each user), it is possible to allocate a wider minimum assured bandwidth to a session that is given a higher value of importance points 502 for each user, among the sessions having the same service type.

In terms of a practical way of operation, the control policy table 500 may be prepared, for example, in a user management server 70 provided with the user authentication function shown in FIG. 1, so that the ISP can add a new user entry to the table when a user subscribes to the ISP and update the types of service and importance points for each service when the services offered by the ISP are changed.

Now, a first embodiment of a communication bandwidth control method for the sections of the tunnels through which packets are forwarded in the network architecture of FIG. 1 will be described below.

Upon receiving a communication request from a user terminal 40 via a private router 30, each LAC 10 (10-1 to 103) establishes a connection (tunnel) to a LNS 20 corresponding to the ISP, to which the terminal user subscribed, to encapsulate and forward received packets to the LNS. If there is already a tunnel between the LAC 10 and the LNS 20, a new communication session for each user or service can be simply set up through the existing tunnel and there is no need to establish a new tunnel.

In the access network N10, since the sessions from a plurality of users toward the ISP networks N20-1 and N20-2 are terminated on the LNSs 20-1 and 20-1 serving as the nodes for connecting to the ISP networks N20, traffic concentrates on these nodes. In the present invention, the LNS 20-1 (20-2) refers to the traffic status of a route toward the router 71-1 (71-2) and allocates an available communication bandwidth to every session that is established newly. In this case, the LNS 20-1 notifies the LAC 10 (10-1 to 10-3) that has requested to establish the session of the communication bandwidth allocated to the session by sending a control packet C (C1 to C3). Having received this notification, the LAC 10 stores the communication bandwidth into its internal session management table 400 and communication control tables to be referred to by its interface modules and requests the requester private router 30 to set a transmission rate by designating the communication bandwidth (notification of session information).

As to the notification of session information from the LNS 20 to the LAC 10, there are two methods. The first method is to designate a value of minimum communication bandwidth assured for the session. The second method is to designate a value of priority of the session instead of the value of communication bandwidth, so that the LAC 10 can share a limited communication bandwidth across the ISP network among a plurality of sessions in accordance with the values of priority for each session. A term "bandwidth/priority" will be used in the present invention to mean that allocation of resources to sessions may be designated in terms of bandwidth and/or priority.

In the above process of allocating a communication bandwidth to a session and determining a priority value of a communication service, if the control policy table 500 shown in FIG. 5 is held in the flow and QoS management database 224, the LNS 20 can determine bandwidth/priority to be allocated to each session by referring to this table. In an embodiment which will be described hereinafter, the user management server 70 provided in each ISP network has the control policy table 500 and each LNS obtains priority points to be allocated to each session from the user management server 70 and determines a bandwidth for each session according to the type of service and the priority points.

The user management server 70 stores tunnel authentication information to be used when a tunnel is established between a LAC and a LNS and user authentication information associated with the ID of each user who subscribed to the ISP. The user management server 70 is provided with a tunnel authentication function and a user authentication function in addition to the function of determining priority points for each session by referring to the above control policy table.

Figure 6:
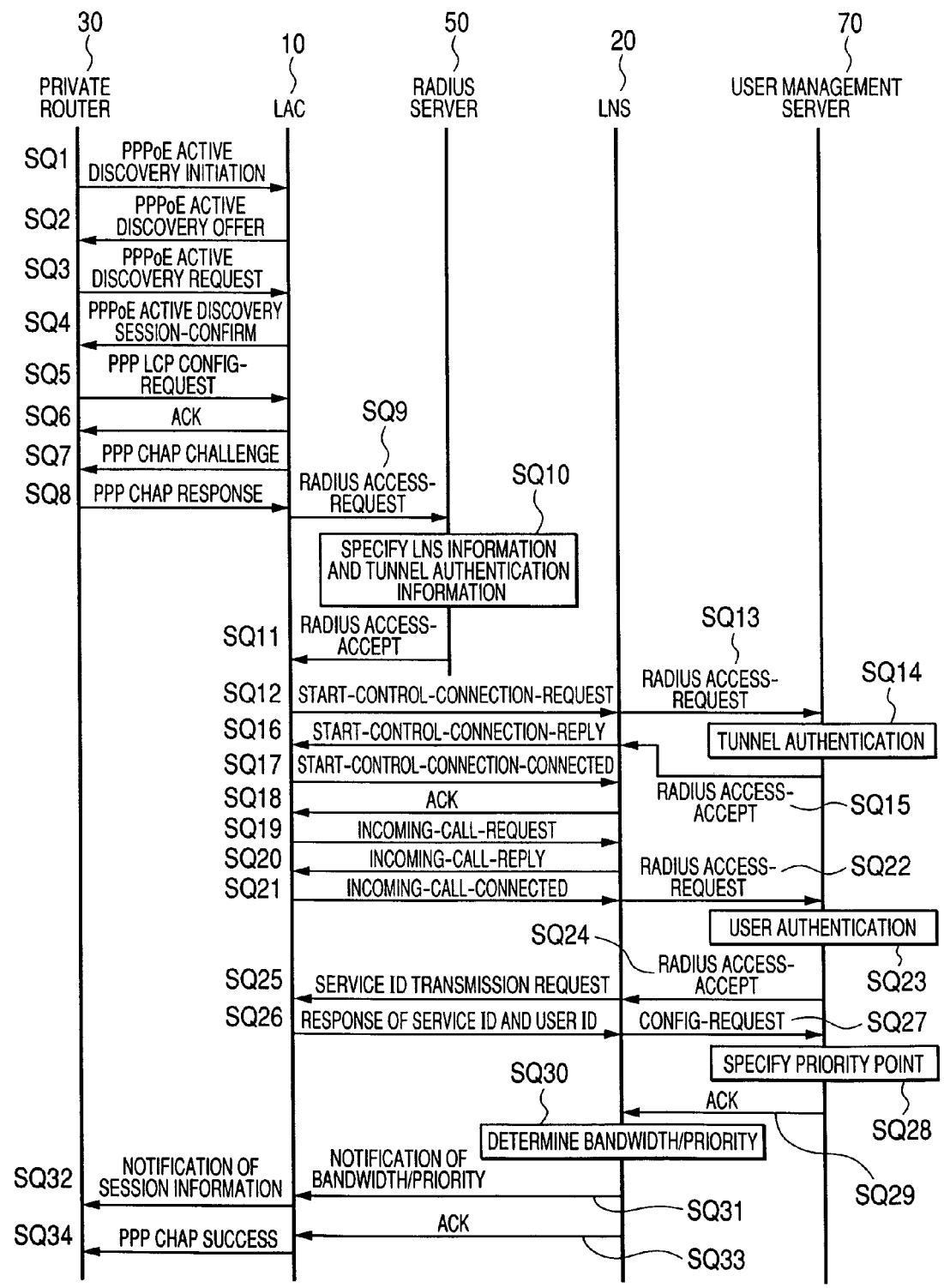
FIG. 6 is a sequence diagram showing a first embodiment of communication bandwidth control according to the present invention in the network shown in FIG. 1.

FIG. 6 shows a first embodiment of communication sequence according to the present invention in the access network N10.

In FIG. 6, SQ1 to SQ4 represent a PPPoE Discovery state and SQ5 to SQ34 represent a PPPoE Session state. The first embodiment is characterized in that a LAC 10 notifies a LNS 20 of the type of service (service ID) for the user in order to determine bandwidth/priority to be allocated to the session before user packet communication is initiated.

When setting up a PPP session, a private router 30 designates a type of service (Web browsing, IP telephone, TV receiving, P2P service, etc) to be offered to the user through a newly set up session, in the payload of a PPP over Ethernet (PPPoE) packet which is applied to Asymmetric Digital Subscriber Line (ADSL) and Fiber to The Home (FTTH) as will be described later by referring to FIG. 8. Having received the PPPoE packet, the LAC 10 retains the type of service extracted from the payload of the received packet and notifies the LNS 20 of the type of service when user authentication is performed.

Upon power on or receiving a session connection request from a user terminal 40, the private router 30 identifies the type of service to be provided to the user and starts a procedure for setting up a communication session in combination with the LAC 10.

The private router 30 first sends a PPPoE Active Discovery Initiation (PADI) packet to the LAC 10 to obtain the MAC address of the LAC10 to which the user terminal should be connected (SQ1). Having received the PADI packet, the LAC 10 sends a PPPoE Active Discovery Offer (PADO) packet specifying its MAC address back to the private router 30 (SQ2) In response to the PADO packet, the private router 30 sends a PPPoE Active Discovery Request (PADR) packet to request a session ID to the LAC 10 (SQ3). Having received the PADR packet, the LAC 10 returns a PPPoE Active Discovery Session-confirm (PADS) packet to the private router 30 (SQ4). Then, a PPPoE session is established between the private router 30 and the LAC 10. In this case, the private router 30 sets the type of service for the user in both the PADI packet and the PADR packet. The LAC 10 retains the type of service extracted from either of the above packets received.

Next, according to a link layer connection procedure, the private router 30 sends an LCP configuration request packet (SQ5) and the LAC 10 returns an ACK packet (SQ6). After that, the LAC 10 sends to the private router 30 a PPP CHAP Challenge packet to request the transmission of user authentication information (SQ7). After the private router 30 sends a PPP CHAP Response packet including user authentication information such as user ID and a password (SQ8), the LAC 10 sends a RADIUS Access-Request packet including the user authentication information received to the authentication server (RADIUS server) 50 (SQ9). The authentication server 50 refers to the database, based on the user authentication information received, and specifies LNS information including the address of the LNS 20 corresponding to the destination ISP network and tunnel authentication information to authenticate whether set up of a new tunnel between the LAC 10 and the LNS 20 is allowed (SQ10), and notifies the LAC 10 of the specified information by sending a RADIUS Access-Accept packet.

By applying the LNS address notified from the authentication server 50, the LAC 10 sends to the LNS 20 a Start Control-Connection-Request packet to request a tunnel setup (SQ12). Having received the above request packet, the LNS 20 sends a RADIUS Access-Request packet including the tunnel authentication information extracted from the above request packet to the user management server (authentication server) 70 in the ISP network (SQ13). The user management server 70 executes tunnel authentication to determine whether the tunnel set up is allowed, based on the above tunnel authentication information (SQ14), and returns a RADIUS Access-Accept packet indicating a result of the authentication to the LNS 20 (SQ15). The LNS 20 notifies the requester LAC 10 of the result of the above tunnel authentication by sending a Start-Control-Connection-Reply packet (SQ16). Having received the Start-Control-Connection-Reply packet, the LAC 10 sends a packet for notification of connection (Start-Control-Connection-Connected) to the LNS 20 (SQ17). When the LNS 20 returns ACK (SQ18), a tunnel is established between the LAC 10 and the LNS 20. The above procedure (SQ12 to SQ18) is performed in accordance with L2TP.

After that, the LAC 10 sends a session setup request (Incoming-Call-Request) packet to the LNS 20 (SQ19), the LNS 20 returns a response packet (Incoming-Call-Reply) (SQ20), and the LAC 10 sends an Incoming-Call-Connected packet including the user authentication information that has been received from the private router 30 to the LNS 20 (SQ21).

Upon receiving the Incoming-Call-Connected packet, the LNS 20 sends a RADIUS Access-Request packet including the user authentication information extracted from the received packet to the user management server 70 in the ISP network (SQ22). The user management server 70 determines whether the password specified in the user authentication information received matches with the pre-registered password associated with the user ID (user authentication SQ23). If the user authentication is successful, the user management server 70 returns a RADIUS Access-Accept packet to the LNS 20 (SQ24). If the user authentication is unsuccessful, the user management server 70 returns a RADIUS Access-Reject packet to the LNS 20.

When the user authentication is successful, the LNS 20 sends a request for transmitting the type of service to the LAC 10 (SQ25). Having received the above request, the LAC 10 sends to the LNS 20 a response packet including the type of service, which has been received with the PPPoE packet upon the PPPoE session setup, and the user ID specified in the user authentication information (SQ26). The LNS 20 sends to the user management server 70 a Configuration-request packet including the user ID and the type of service extracted from the above response packet (SQ27). From the control policy table 500 shown in FIG. 5, the user management server 70 specifies priority points corresponding to the combination of the user ID and the type of service indicated in the Configuration-request packet (SQ28) and returns ACK specifying the priority points to the LNS 20 (SQ29).

The LNS 20 determines a bandwidth to be allocated to the session being now established, according to the type of service and the priority points specified in the above ACK (SQ30). A minimum assured bandwidth required for the session is specified from a minimum assured bandwidth table (not shown) in which minimum assured bandwidth is predefined for each type of service. At this time, as described above, by making a modification to the minimum assured bandwidth so as to add a bandwidth depending on the priority points, it is possible to allocate a wider minimum assured bandwidth to a session that is given a higher value of importance points 502 for each user among the sessions having the same service type.

One feature of the present invention resides in that, if free bandwidth as much as the above minimum assured bandwidth is not available for a line toward the ISP network router 71, the free bandwidth for a new session can be procured by adjusting the bandwidths having been allocated to the already established sessions, according the priority points of the sessions. Specifically, the LNS 20 refers to the traffic status of a line toward the ISP network router 71, determines how much bandwidth is free and available, and determines a bandwidth to be allocated to the session being now established. If necessary, by adjusting the bandwidths having been allocated to the existing sessions, the LNS 20 procures a bandwidth to be allocated to the session being now established. Adjusting the bandwidths of the existing sessions is performed according to the priority points of the sessions.

The LNS 20 stores into the session management table the allocated bandwidth, the value of priority points notified from the user management server 70, the session ID, and the type of service, as a set of related attributes associated with the tunnel ID. After notifying the LAC 10 of the above bandwidth (or priority points) by sending a bandwidth/priority notification packet (SQ31), the LNS 20 returns a response packet (ACK) for the Incoming-Call-Connected packet (SQ33).

The LAC 10 stores into the session management table 400 the bandwidth (or priority points) notified by the bandwidth/priority notification packet together with the session ID and the type of service and sends a notification of session information including the allocated bandwidth to the private router 30 (SQ32). Upon receiving the ACK packet from the LNS 20, the LAC 10 sends an authentication response packet (PPP CHAP success) to the private router 30 (SQ34).

After that, in accordance with normal communication sequence using PPP and L2TP, an IP address is assigned to the private router 30 by IPCP, and accounting operation about the communication on the session starts between the user management server 70 and the LNS 20. Through the above-described communication sequence, the PPP session is established between the private router 30 and the LNS 20, whereby the private router 30 can communicate user packets over the IP network via the LAC 10, LNS 20, and the router 71 in the ISP network.

Figure 7:
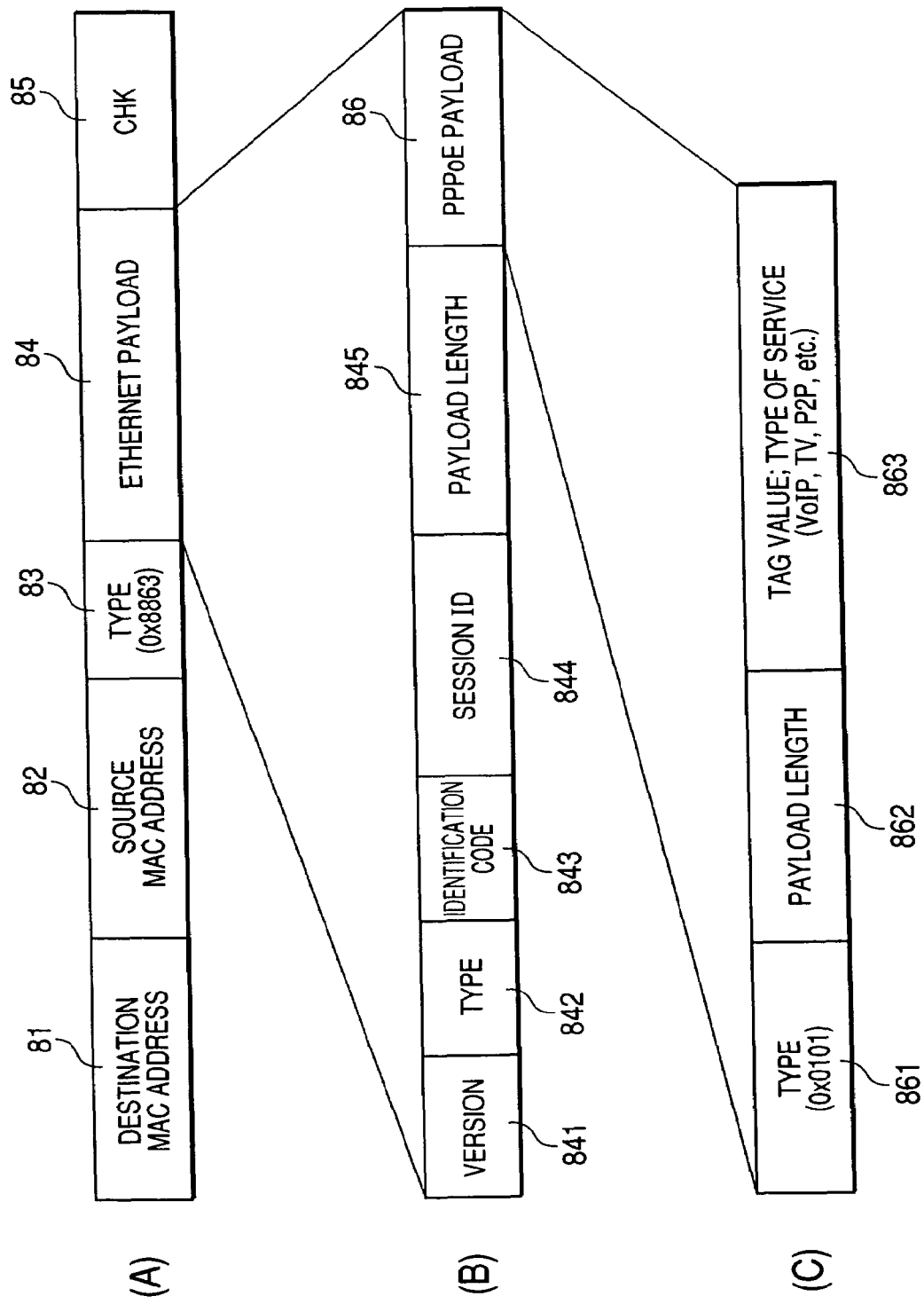
FIG. 7 shows an example of a PPPoE packet to be transmitted from a personal router to a LAC.

FIG. 7 (A) shows an example of a format of a PPPoE Active Discovery (Initiation/Request) packet 80 that is used in the PPPoE Discovery state in FIG. 6. Ethernet frames are used in PPPoE.

The PPPoE Active Discovery packet 80 is comprised of a destination MAC address 81, a source MAC address 82, an Ethernet type 83, an Ethernet payload 84, and a checksum (CHK) 85. The Ethernet type 83 is used to distinguish between the PPPoE Discovery state and the PPPoE session state including LCP negotiation and authentication processes. In the PPPoE Discovery state, a value of "0x8863" is set as the Ethernet type 83.

The Ethernet payload 84 of the PPPoE Active Discovery packet 80 is comprised of, as shown in FIG. 7 (B), a PPPoE version field 841, a type field 842 in which a fixed value of "0x1" is set, an identification code field 843 for specifying the type of packet such as PADI, PADO, etc., a PPPoE session ID field 844, a PPPoE payload length field 845, and a PPPoE payload 86. The type of service (service ID) that is used in the present invention is set in the PPPoE payload 86.

The PPPoE payload 86 is comprised of, as shown in FIG. 7 (C), a type field 861, a payload length field 862, and a TAG value field 863. By setting a different value in the type field 861, a different type of information can be set in the PPPoE payload 86. In this embodiment, a value of "0x0101" is set in the type field 861 and a service ID specifying the type of service (VoIP, TV, P2P, etc.) is set, using a UTF-8 character set, in the TAG value field 863. The above-described packet structure complies with PPPoE specifications.

Figure 8:
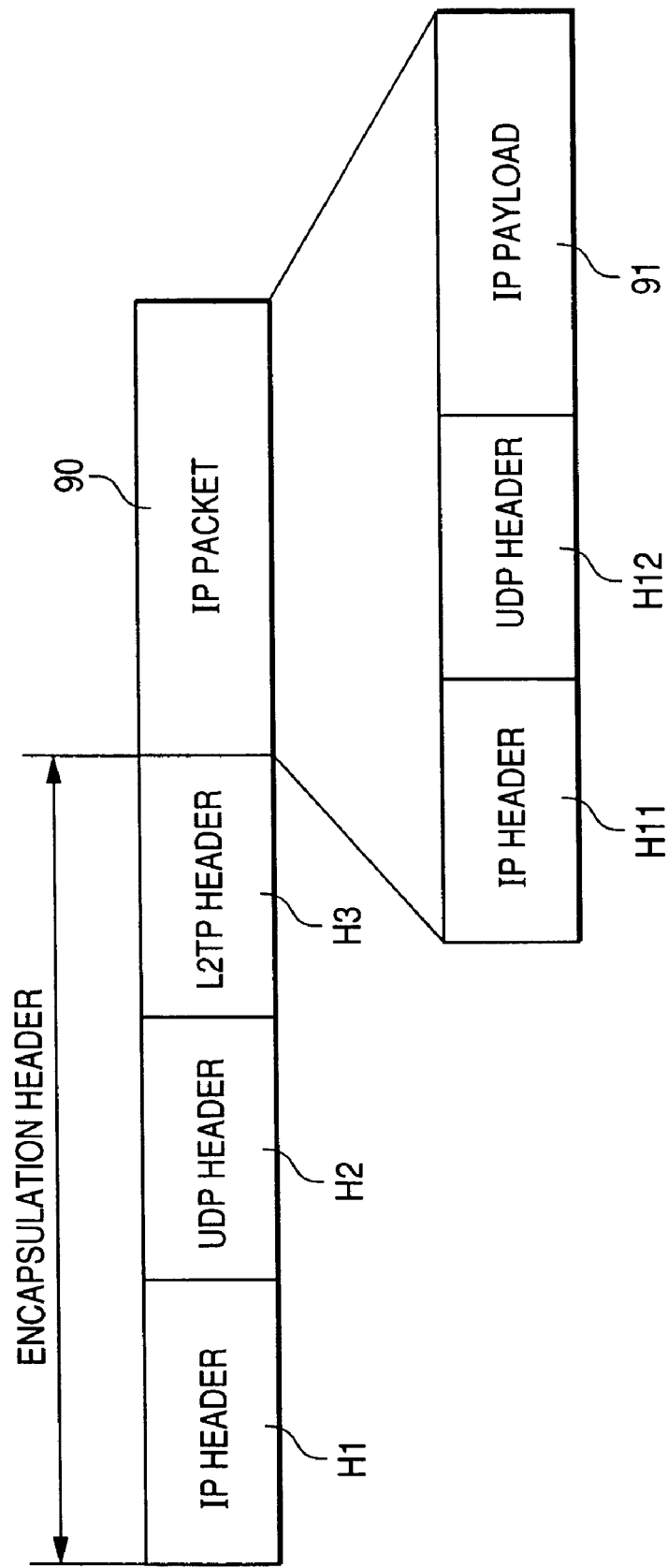
FIG. 8 shows an example of a format of an encapsulated packet to be communicated across the access network.

FIG. 8 shows a format of an encapsulated packet to be communicated between a LAC 10 and a LNS 20.

The encapsulated packet has a form made up by adding to an IP packet 90 an encapsulation header including an IP header H1, a UDP header H2, and an L2TP header H3. The IP packet 90 is comprised of an IP header H11, a UDP header H12, and an IP payload 91.

Control packets to be communicated between a LAC 10 and a LNS 20 for the sake of setting up a tunnel and a session are distinguished by a message type included in the L2TP header. The payload data (IP packet 90) is not required for the control packets.

Figure 9:
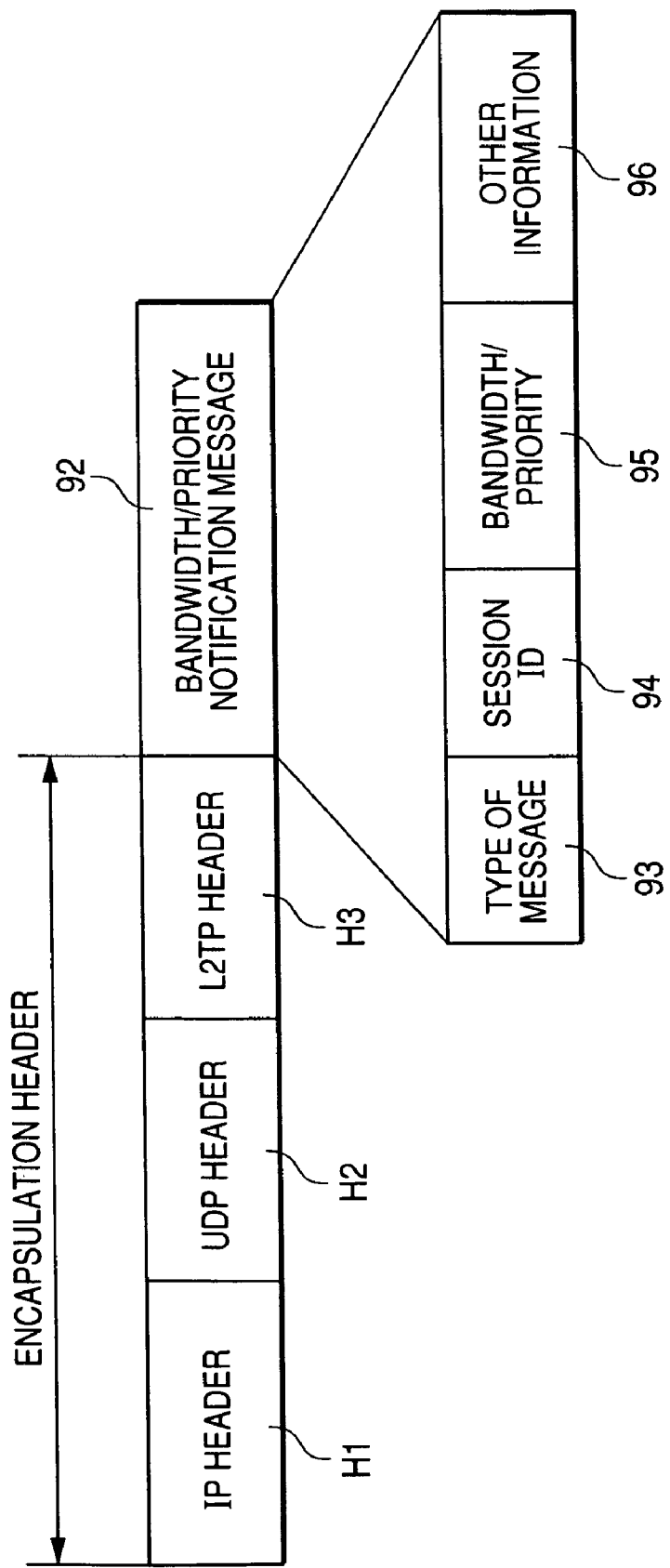
FIG. 9 shows an example of a format of a control packet for bandwidth/priority notification, which is transmitted from a LNS to a LAC.

FIG. 9 shows an example of a format of control packets C1 to C3 to be transmitted from a LNS 20 to a LAC 10 for bandwidth/priority notification.

Each of the control packets C1 to C3 includes in the payload following the encapsulation header, a bandwidth/priority notification message 92 indicating a type of message 93, session ID 94 for which bandwidth/priority should be set, bandwidth/priority 95, and other information 96. The bandwidth/priority 95 specifies the bandwidth of the session determined by the LNS 20, and/or the priority points of the session determined by the service management server 70 in accordance with the control policy.

The bandwidth/priority notification message 92 is applicable as a session information notification from the LAC 10 to the appropriate private router 30 by replacing the encapsulation header with a new IP header. Furthermore, this message can be applied as a notification packet for bandwidth setting information in a tunneling network that is used to forward non-PPPoE packets such as, for example, MPLS, IPsec, and VLAN.

Next, by referring to flowcharts shown in FIGS. 10 through 12, description will be made on the communication control routines to be executed in order to carry out the communication sequence shown in FIG. 6 by the controllers of LAC 10, LNS 20, and private router 30, respectively. Assuming a general tunneling process, the operations of the LAC 10 and LNS 20 in this embodiment may be applicable as the operations of a tunnel initiation node (ingress edge node) and a tunnel termination node (egress edge node).

Figure 10:
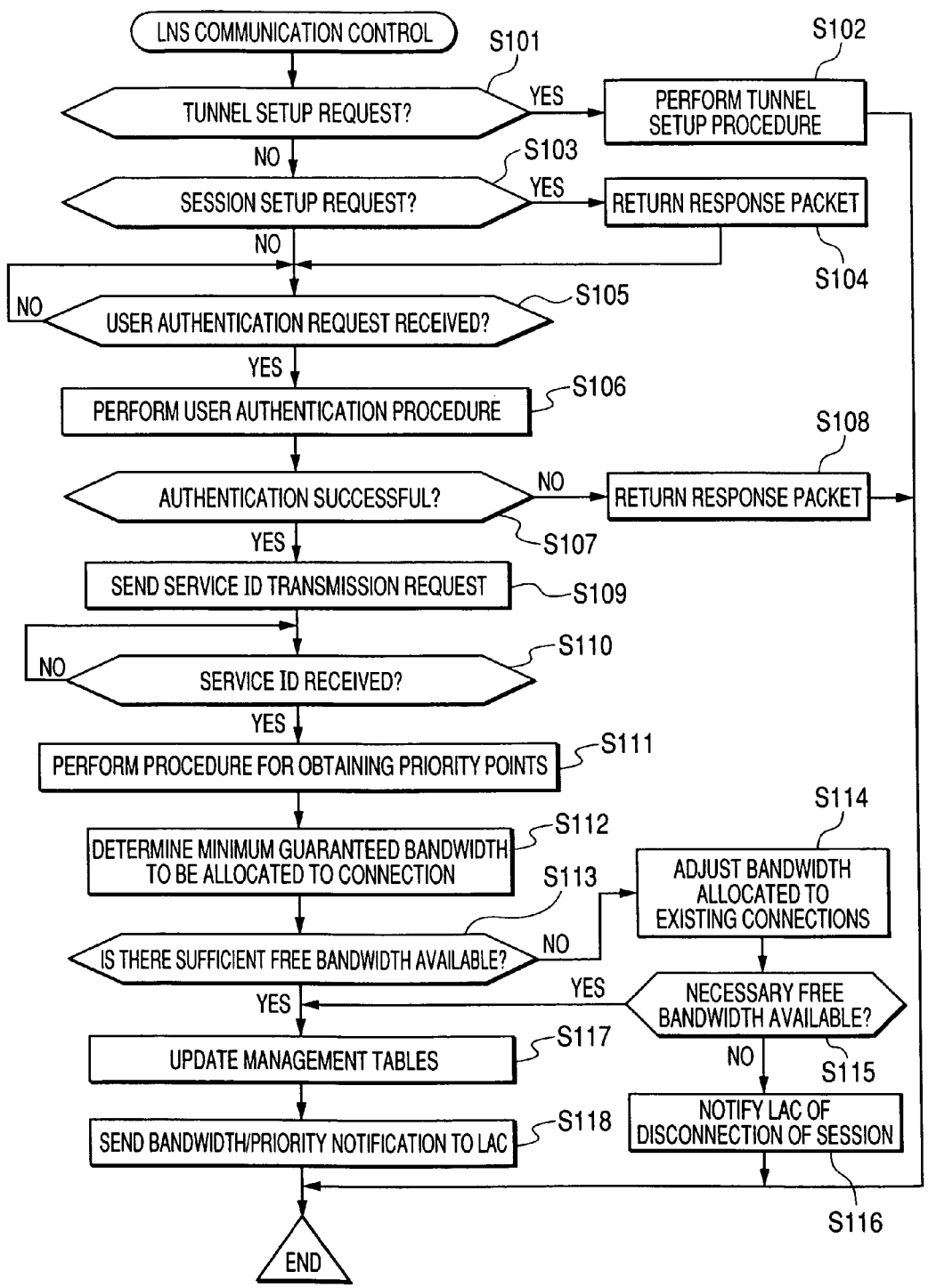
FIG. 10 is a flowchart of a communication control routine to be executed on a LNS in the first embodiment of the present invention.

FIG. 10 shows a flowchart of the communication control routine to be executed on the LNS 20.

The LNS 20 (controller 200) identifies the type of a communication control packet received and, if the received packet is a tunnel setup request packet (Start-Control-Connection-Request) (step S101), performs the tunnel setup procedure corresponding to the steps SQ13 to SQ16 in FIG. 6 (step 102), and exits this routine.

If the received packet is a session setup request packet (Incoming-Call-Request) (S103), the LNS 20 returns a response packet (ACK) (S104). Upon receiving a user authentication request packet (Incoming-Call-Connected) (S105), the LNS 20 performs the user authentication procedure corresponding to the steps SQ22 to SQ24 in FIG. 6 (S106). By judging the result of the user authentication (S107), if the user authentication is unsuccessful, the LNS 20 sends a user authentication failure message to the LAC 10 (S108) and exits this routine.

If the user authentication is successful, the LNS 20 sends a packet to request for the service ID (the type of service) to the LAC 10 (S109) and waits for a response from the LAC 10 (S110). Upon receiving a response packet including the service ID and user ID from the LAC 10, the LNS 20 performs the procedure for obtaining priority points corresponding to the steps SQ27 to SQ 29 in FIG. 6 (S111). After obtaining the priority points from the user management server 70, the LNS 20 determines a minimum guaranteed bandwidth to be allocated to the connection (S112). The minimum guaranteed bandwidth may be modified in accordance with the priority points.

From the status of a communication line toward the ISP network (a communication line connected to the router 71), the LNS 20 determines whether free bandwidth as much as the minimum guaranteed bandwidth determined in step S112 is available (S113). The amount of free bandwidth is determined from a difference between the bandwidth of the communication line toward the ISP network and the sum of the bandwidths 404 allocated to the sessions obtained from the session management table 400 shown in FIG. 4. If there is a sufficient free bandwidth, the LNS 20 adds a new control information entry for a new session to the management tables such as the session management table and communication control table (S117), sends the bandwidth/priority notification to the LAC 10 (S118), and exits this routine.

In the absence of necessary free bandwidth as the minimum guaranteed bandwidth, the LNS 20 adjusts the bandwidths having been allocated to existing connections, according to the priority points of these connections (S114). This adjustment narrows the bandwidths of the existing connections to procure a free bandwidth necessary for the new connection. The bandwidth adjustment (reduction) may be performed for only low-importance sessions, for example, like a Web session and a P2P session, by referring to the importance points for each type of service. This bandwidth adjustment should be performed to an extent not to make any bandwidth lower than the lower limit of bandwidth pre-defined for each type of service.

By judging the result of the bandwidth adjustment (S115), if necessary free bandwidth is not available yet, that is, if it is determined that communication by the new session is impossible, the LNS 20 notifies the LAC 10 of disconnection of the session (S116), and exits this routine. As the result of the bandwidth adjustment, if necessary free bandwidth is available, the LNS 20 executes steps S117 and S118, and exits this routine. When a bandwidth is allocated to the new session in consequence of the bandwidth adjustment, the LNS 20 updates the management tables with regard to the sessions whose bandwidths have been altered and sends the bandwidth/priority notification indicating the altered bandwidths to the LAC 10.

Figure 11:
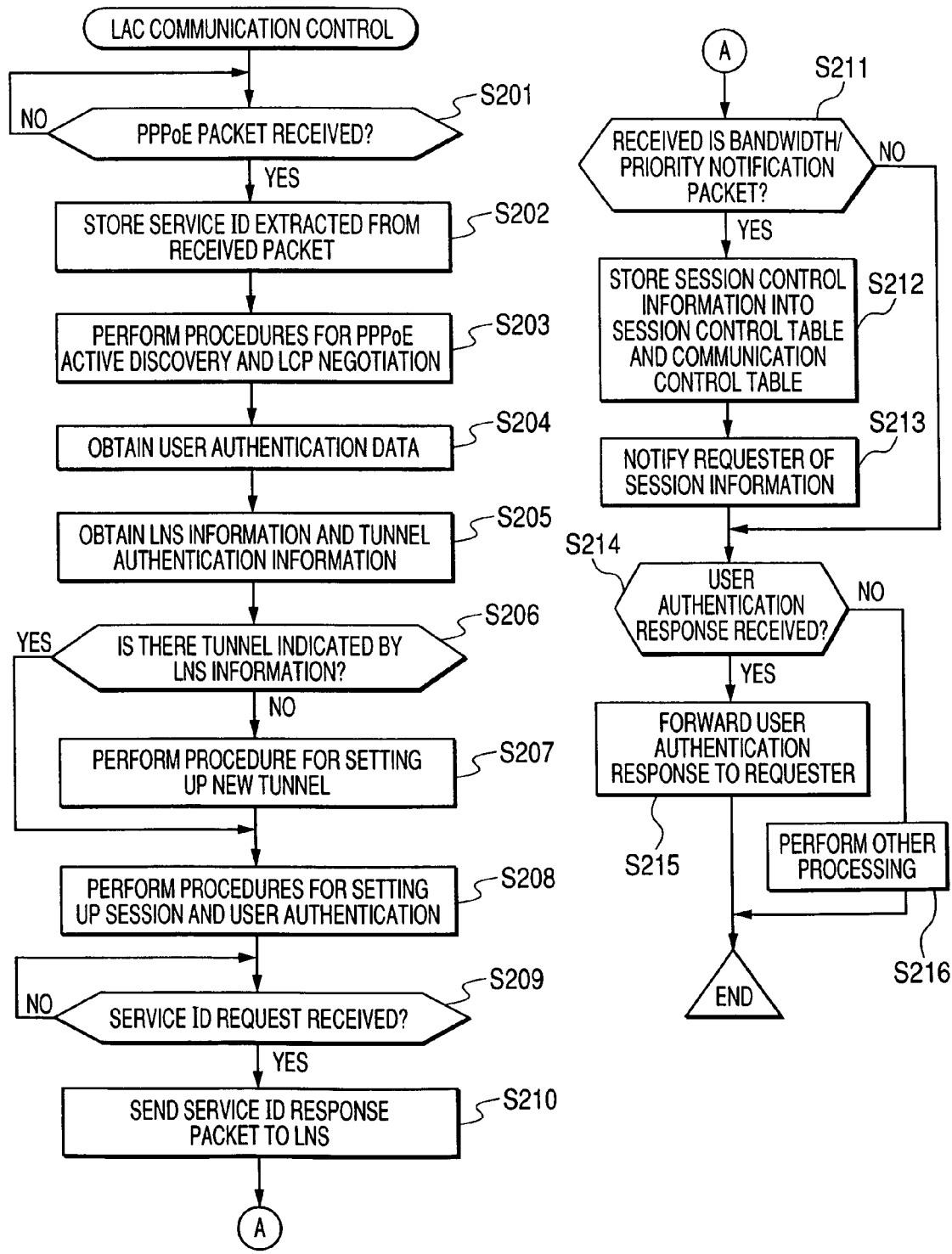
FIG. 11 is a flowchart of a communication control routine to be executed on a LAC in the first embodiment of the present invention.

FIG. 11 shows a flowchart of the communication control routine to be executed on the LAC 10.

The LAC 10 waits for receiving a PPPoE packet from the private router 30 (S201). Upon receiving a PPPoE packet, the LAC 10 extracts the type of service from the payload of the received packet and stores it (202), and performs the procedures for PPPoE Active discovery and LCP negotiation corresponding to the steps SQ2 to SQ6 in FIG. 6 (S203).

Upon completion of the LCP negotiation, the LAC 10 obtains user authentication data from the private router 30 (S204) and obtains LNS information and tunnel authentication information from the RADIUS server 50. The LAC 10 checks whether there exists a tunnel to the LNS identified by the LNS information, IP address, as an example (S206) from the session management table 400. If the tunnel has been established, the LAC 10 performs in combination with the LNS 20 the procedures for setting up a session and user authentication (S208) corresponding to the steps SQ19 to SQ21 in FIG. 6. If the tunnel has not been established yet, after performing the procedure for setting up a tunnel (S207) corresponding to the steps SQ11 to SQ18 in FIG. 6, the LAC 10 performs the procedures for setting up a session and user authentication (S208) in combination with the LNS 20.

Upon receiving the request for service ID from the LNS 20 (S209), the LAC 10 sends to the LNS 20 a service ID response packet including the service ID stored in step S202 and user ID specified in the user authentication information (S210) and waits for a response from the LNS 20. Upon receiving the bandwidth/priority notification packet from the LNS 20 (S211), the LAC 10 stores the session control information into the session control table 400 and the communication control table (S212) and notifies the private router 30 of the session information (S213). Upon receiving a response packet (ACK) to the user authentication request from the LNS 20 (S214), the LAC 10 sends a user authentication response packet (PPP CHAP Success) to the private router 30 (S215). When a control packet other than the response packet (ACK) was received, the LAC 10 performs other processing (S216) and exits this routine.

Figure 12:
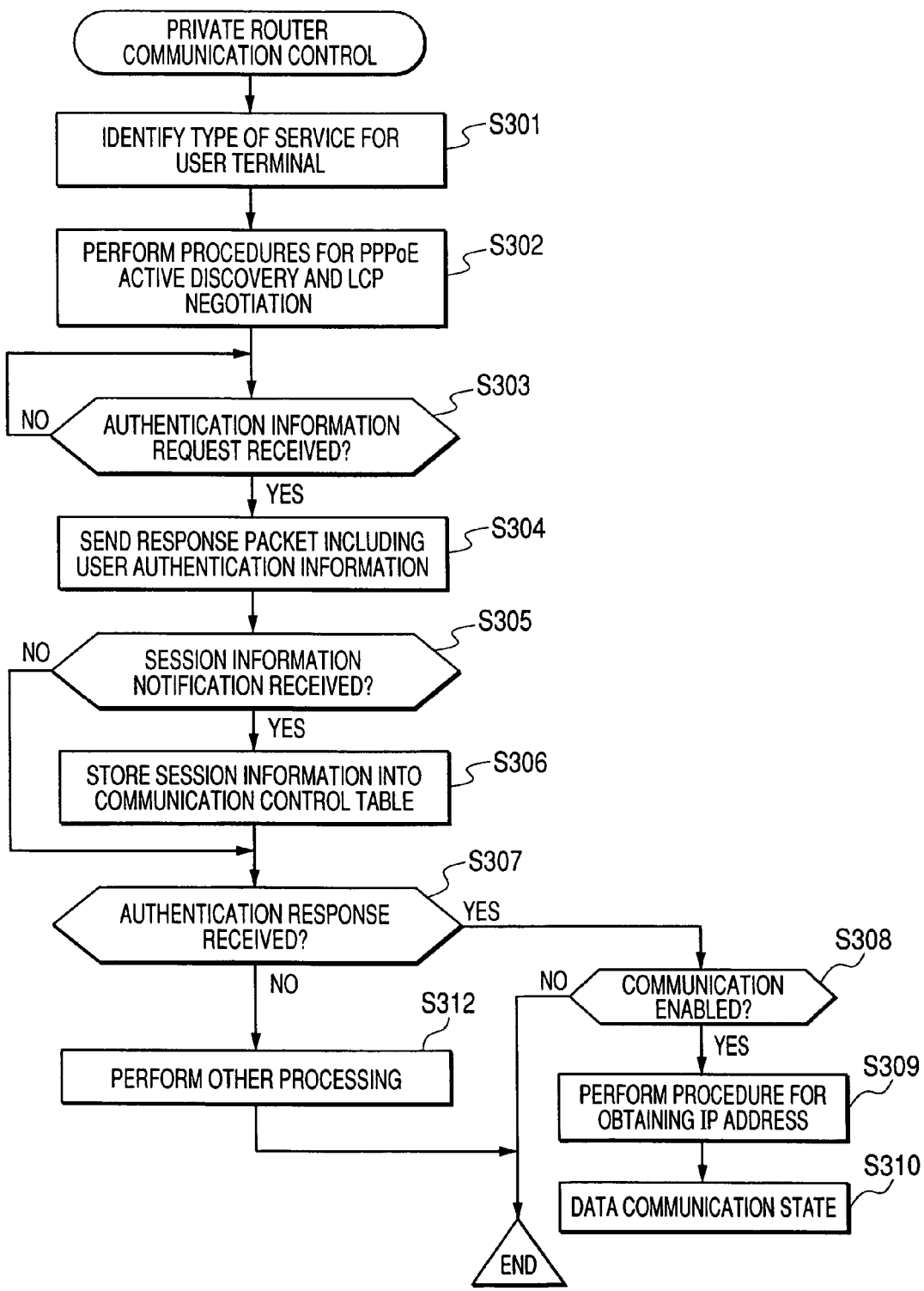
FIG. 12 is a flowchart of a communication control routine to be executed on a private router in the first embodiment of the present invention.

FIG. 12 shows a flowchart of the communication control routine to be executed on the private router 30.

Upon receiving a connection request from a user terminal, the private router 30 identifies the type of service to be offered to the user terminal (S301). Then, the private router 30 performs in combination with the LAC 10 the procedures for PPPoE Active Discovery and LCP negotiation corresponding to the steps SQ1 to SQ6 in FIG. 6 (S302), and waits for receiving a request for authentication information from the LAC (S303). A PPPoE Active Discovery packet that is sent from the private router 30 to the LAC 10 includes the type of service (service ID).

Upon receiving the request for authentication information (PPP CHAP Challenge) from the LAC 10, the private router 30 sends a response packet (PPP CHAP response) including user authentication information (S304) and waits for a session information notification from the LAC 10 (S305) User authentication information that should be sent to the LAC may be retained beforehand in the private server or may be obtained by query to the user terminal each time a session is set up.

Upon receiving the session information notification from the LAC 10, the private router 30 stores the session information including bandwidth/priority information into the communication control table (S306). Upon receiving the authentication response (ACK) from the LAC 10, the private router 30 judges the result of the authentication (S308). If communication is enabled, the private router 30 performs the procedure for obtaining its IP address in combination with the LAC 10 (S309) and enters a data communication state (S310) If communication is disabled, the private router 30 aborts the process of establishing a session and exits this routine. If the received packet is not the authentication response, the private router 30 performs other processing (S312).

Figure 13:
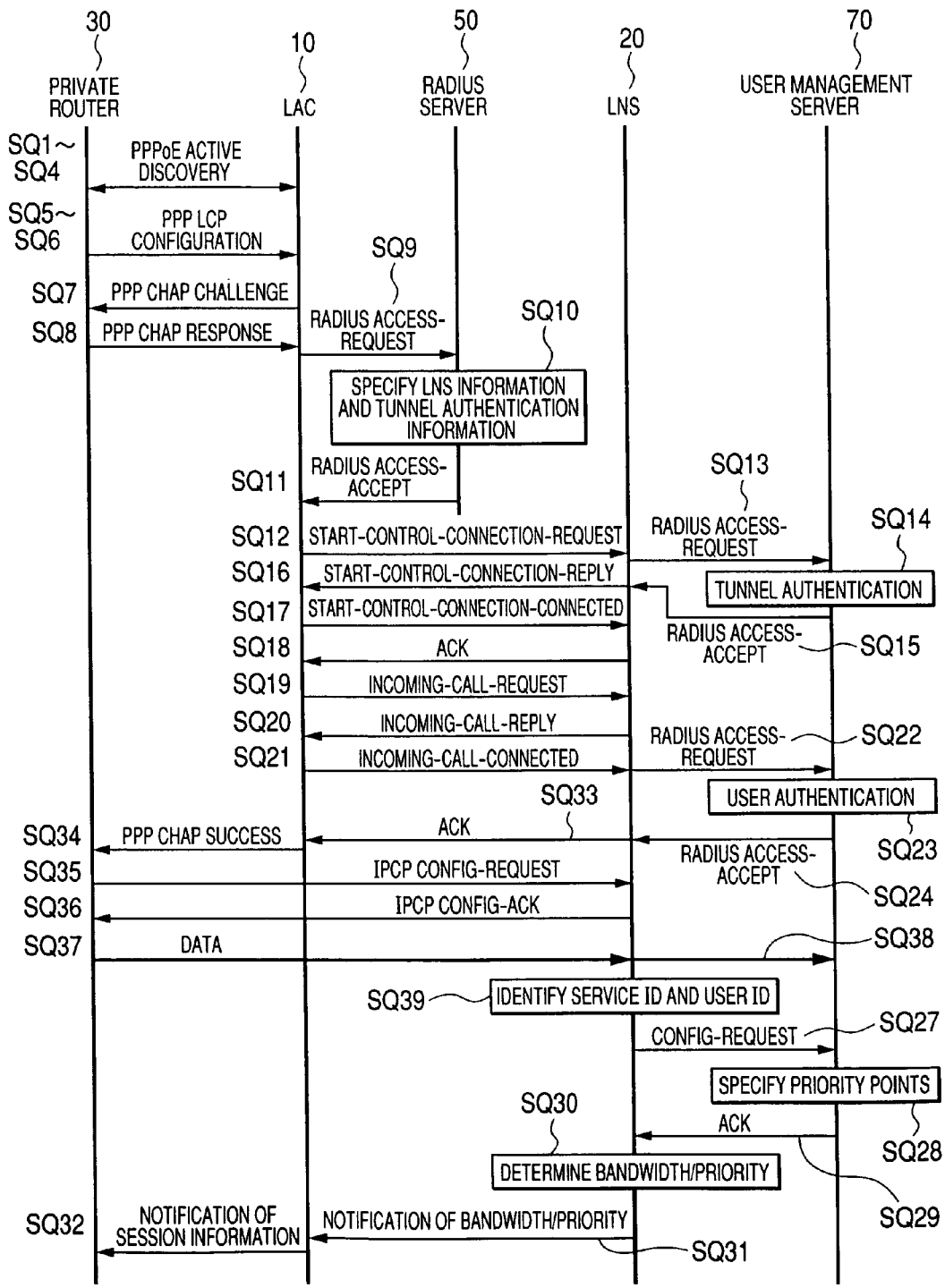
FIG. 13 is a sequence diagram showing a second embodiment of communication bandwidth control according to the present invention in the access network shown in FIG. 1.

FIG. 13 shows a second embodiment of communication sequence according to the present invention in the access network N10. The second embodiment is characterized in that, after establishing an individual communication session requested from a user terminal between a LAC 10 and a LNS 20, the LNS 20 determines a bandwidth to be allocated to the session when the first user packet was received.

Communication sequence steps SQ1 to SQ24 are the same as the first embodiment described in FIG. 6.

In the second embodiment, when the result of user authentication was received from the user management server 70, the LNS 20 returns a response packet (ACK) for the user authentication request to the LAC 10 (SQ33). When it is judged that the user authentication was successful from the response packet, the LAC 10 sends an authentication response packet (PPP CHAP success) to the private router 30 (SQ34).

Having received the authentication response packet, the private router 30 sends an IPCP Configuration-Request to the LNS 20 (SQ35). When the LNS 20 sends an IPCP Configuration-ACK including the IP address to be used by the user terminal to the private router 30 (SQ36), the setup procedure for communication is completed. After that, the user terminal 40 can transmit user packets to the LNS 20 (SQ37).

In the second embodiment, upon receiving a user packet, the LNS 20 forwards the received packet to the ISP network (SQ38) and, concurrently, determines whether a bandwidth has been allocated to the session of the received packet. If the bandwidth has not been allocated, the LNS 20 identifies the type of service and user ID based on the header information of the received packet (SQ39), and sends a Configuration-request packet including the type of service and user ID to the user management server 70 (SQ27). By referring to the control policy table 500, the user management server 70 specifies priority points corresponding to the combination of the user ID and the type of service indicated in the Configuration-request packet (SQ28) and returns ACK specifying the priority points to the LNS 20 (SQ29).

After that, similarly to the first embodiment, the LNS 20 determines a bandwidth to be allocated to the session (SQ30) and sends a bandwidth/priority notification packet to the LAC 10 (SQ31), and the LAC 10 notifies the private router 30 of the session information (SQ32). The private router 30 sets the transmission rate for transmitting subsequent data packets incoming from the user terminals, according to the bandwidth indicated by the notification packet.

FIG. 14 and FIG. 15 show examples of a flag table 600 and a port number/type of service conversion table 610 installed in a LNS 20 according to the second embodiment. These tables are used to identify the type of service and the user ID corresponding to a user packet received.

The flag table 600 includes a plurality of entries, each of which indicates the relation among tunnel ID 601, session ID 602, user ID 603, and a flag 604 indicating whether bandwidth allocation has been completed. The flag table 600 is prepared in the memory 243 of each of input line interface modules 240. When the user authentication results in success, the controller 200 of the LNS 20 creates a new table entry for the session and registers the table entry into the flag table 600 in the input line interface module 240 corresponding to the session.

The port number/type of service conversion table 610 indicates the correspondence of a destination port number 611 in the TCP header to a type of service 612. This conversion table 610 is prepared in the memory 220 of the controller 200.

According to the packet processing routine 244, the control processor 242 of each input line interface module searches the above flag table 600 for user ID 603 and flag 604, using a search key of tunnel ID and session ID extracted from the L2TP header H3 of an encapsulated packet received. If the value of flag 604 is "1" indicating that bandwidth has been allocated, the control processor 242 eliminates the encapsulation header from the received packet and performs processing to forward the IP packet according to the routing table.

If the value of flag 604 is "0," the control processor 242 eliminates the encapsulation header from the received packet and performs processing for routing the IP packet. Then the control processor 242 changes the value of flag 604 to "1," generates an internal control packet including the destination port number extracted from the TCP header of the IP packet and the user ID retrieved from the flag table 600, adds an internal header indicating the identifier of the controller 200 to the packet, and outputs the packet to the line interconnection unit 260.

According to the communication control routine 222, the processor (CPU) 210 in the controller 200 reads out the internal control packet from the I/O buffer 230, searches the port number/type of service conversion table 610 for the type of service corresponding to the destination port number, generates a Configuration-request including the type of service thus searched and the user ID specified in the above internal control packet, and sends the packet to the user management server 70. After that, the processor 210 performs the operation corresponding to the steps S111 to S118 shown in FIG. 10 and notifies the LAC 10 of bandwidth/priority.

If a sufficient space is available in the memory of each input line interface module, the port number/type of service conversion table 610 may be prepared in the memory of each input line interface module, so that each interface module can perform conversion from port number to type of service and notify the controller 200 of user ID and type of service.

Conversely, in order to save the capacity of the memory 243 of each input line interface module, the user ID 603 may be omitted from the flag table 600 formed in the memory, so that this table is used to confirm only the status of the flag 604 corresponding to the tunnel ID and session ID. In this case, a flag table in which each entry includes the user ID 603 as shown in FIG. 14 has to be prepared in the memory 220 of the controller 200. When the value of flag 604 is "0," the control processor 242 (packet processing routine 244) generates an internal control packet including the port number specified in the TCP header of the IP packet and the tunnel ID and session ID specified in the L2TP header H2, so that the user ID corresponding to the combination of the tunnel ID and session ID is retrieved from the flag table at the controller 200 side.

As an example of modification to the second embodiment, the LNS 20 may send a Configuration-request including the destination port number and user ID to the user management server 70, so that the user management server 70 converts the destination port number to type of service by referring to the port number/type of service conversion table 610. As another example of modification, the LNS 20 may send a Configuration-request including the destination port number, tunnel ID, and session ID to the user management server 70, so that the user management server 70 performs conversion from the destination port number to type of service and conversion from the tunnel ID and session ID to a user ID.

In the second embodiment, after establishing a session between a LAC and a LNS, the LNS 20 autonomously allocates a bandwidth to the session when the first user packet transmitted from the user terminal arrives at the LNS 20. Consequently, the notification of service type from the private router 30 to the LAC 10 by a PPPoE packet and the notification of service type and user ID from the LAC 10 to the LNS 20 become unnecessary. Therefore, the communication control routine to be executed on the LAC 10 may simply perform the setting of transmission bandwidth allocated to a session (storing the session control information: S212) and notifying the private router 30 of the session information (S213) shown in FIG. 11, after establishing the session by a conventional communication control procedure when receiving a bandwidth/priority notification from the LNS 20. Similarly, the private router 30 may simply perform the setting of transmission bandwidth (storing the session information: S306) shown in FIG. 12, after establishing a session by a conventional communication control procedure when receiving the session information from the LAC 10.

Although the first and second embodiments were described about the case where bandwidth/priority for each session is determined at the LNS as the egress edge node of a tunnel, the function of determining bandwidth for each session may also be provided in the LACs 10 as will be described next as a third embodiment of the present invention.

FIG. 16A and FIG. 16B show examples of a communication status management table 700 prepared in a LNS 20 in the third embodiment.

As shown in FIG. 16A, the communication status management table 700 indicates, in association with tunnel ID 701, the number of sessions 702 and allocated bandwidth 703. Here, the number of sessions 702 specifies the number of sessions multiplexed through the same tunnel having the tunnel ID 701. The allocated bandwidth 703 specifies the bandwidth pre-allocated to each tunnel depending on the number of users who utilize the same tunnel. In the case where each LAC forms one tunnel between the LAC and each LNS corresponding to an ISP network, the allocated bandwidth 703 indicates the bandwidth allocated in accordance with the number of users for each ISP accommodated by the LAC.

The feature of the third embodiment resides in that the maximum bandwidth 703 of each tunnel is controlled from the LNS 10 and bandwidth allocation to each session is controlled by each LAC. By carrying out hierarchical bandwidth control, a bandwidth utilization rate per user can be equalized. This embodiment is effective for a situation where each user contracts to set different bandwidths for a basic communication service common to users and an optional communication service for each user under an environment where user terminals are always connected to the Internet.

As shown in FIG. 16B, the communication status management table 700 may include total points of service importance 704 assigned to each session being used in addition to the items shown in FIG. 16A. This communication status management table 700 enables the LNS 20 to reflect importance points for each user to bandwidth control, wherein the importance points differ among users depending on service zone and residential environment of each user when service contract was made.

FIG. 17 shows an example of a tunnel/session management table 800 provided to a LAC 10.

This table 800 comprises a plurality of entries, each of which includes tunnel ID 801 managed by the LAC, maximum available bandwidth 802 allocated to each tunnel by the LNS 20, and information records for each session multiplexed through the tunnel. Each session information record indicates session ID 803, type of service 804, priority points 805 assigned to each session according to the control policy table, and bandwidth 806 allocated to each session by the LAC 10. The LAC 10 can allocate different values of bandwidth 806 to a plurality of sessions multiplexed through the same tunnel within the limits of maximum available bandwidth 802. In this case, priority points 805 are taken into account when bandwidths are allocated to the sessions.

Figure 18:
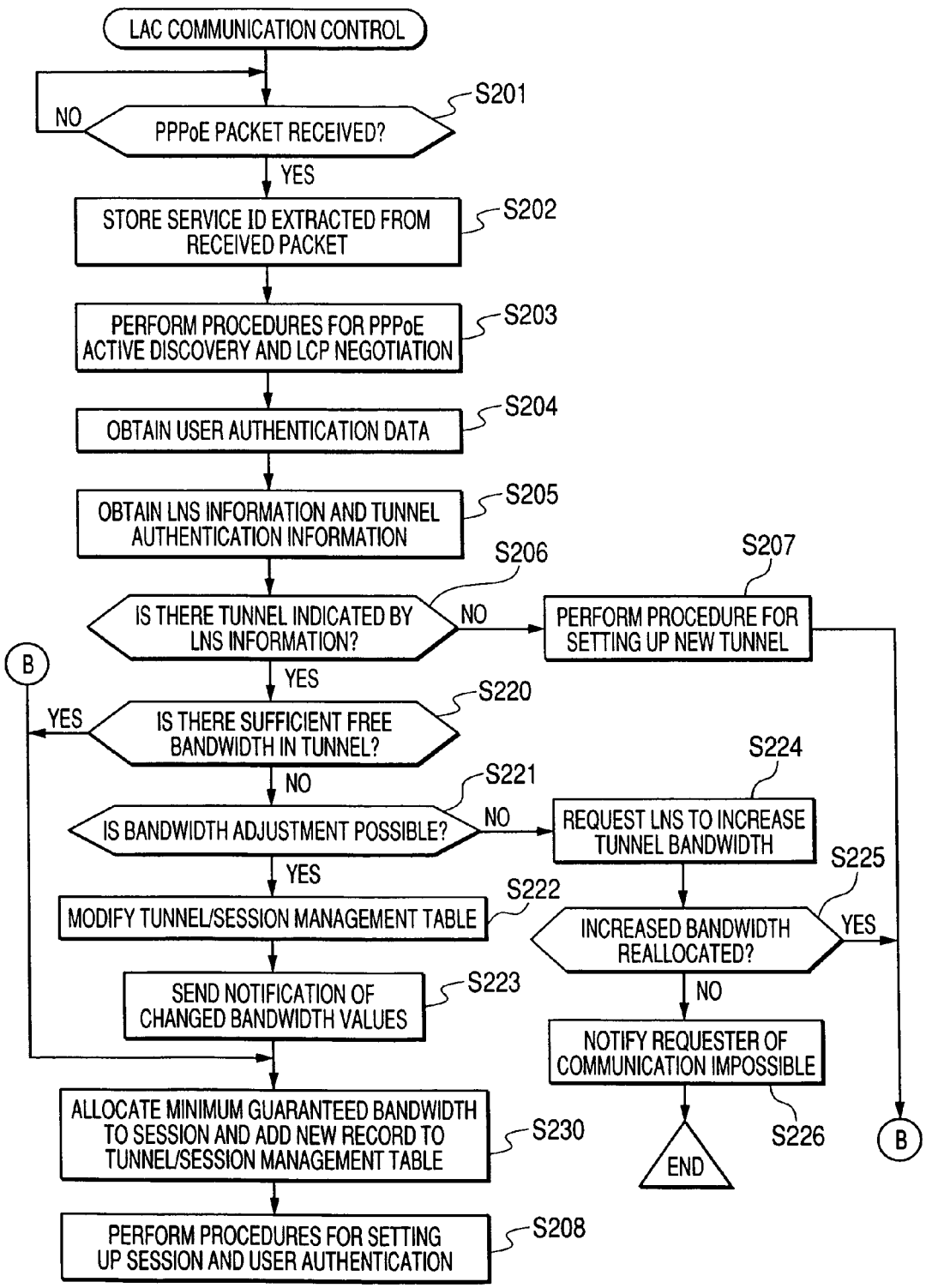
FIG. 18 is a flowchart illustrating an example of a communication control routine to be executed on a LAC in the third embodiment.

FIG. 18 shows a flowchart of communication control to be executed by the LAC 10 in the present embodiment.

Upon receiving a request to establish a new session, the controller 200 of the LAC performs the same steps S201 to S205 as in the first embodiment described in FIG. 11, and determines whether there exists a tunnel through which a new session should be set up, from information obtained from the RADIUS server 50 (S206). If the tunnel exists, the LAC controller 200 refers to the tunnel/session management table 800 and determines whether there is a free bandwidth enough to satisfy the minimum guaranteed bandwidth determined by the type of service to be offered through the new session as a part of the tunnel bandwidth (S220). The amount of free bandwidth is known, by referring to the tunnel/session management table 800, from a difference between the value of maximum bandwidth 802 of the tunnel and the sum of bandwidths 806 having been allocated to the existing sessions in the tunnel.

If there exists a sufficient free bandwidth, the LAC controller 200 allocates the minimum guaranteed bandwidth to the session, adds a new session information record for the session to the tunnel/session management table 800 (S230), performs the session setup procedure, user authentication procedure (S208) and subsequent procedures shown in FIG. 10. If a sufficient free bandwidth for the tunnel remains, it may be possible to allocate a bandwidth wider than the minimum guaranteed bandwidth to each session. Upon receiving a bandwidth/priority notification from the LNS 20, the LAC controller 200 adds the priority points specified in the notification to the above information record as the priority points 805.

If the tunnel does not have free bandwidth necessary for the new session, the LAC controller determines, by referring to the tunnel/session management table 800, whether a necessary free bandwidth is made available by adjusting the bandwidths 806 having been allocated to the existing sessions that have been set up through the tunnel (S221). If wider bandwidths than normal minimum guaranteed bandwidths are assigned to the sessions, bandwidth adjustment is performed for all session information records to an extent not to make allocated bandwidths narrower than a lower limit threshold predetermined for each type of service. If higher priority services come at standard minimum guaranteed bandwidths, bandwidth adjustment is performed for connections with lower priority points, taking the values of priority points 805 into account. As a result of such bandwidth adjustment, if a necessary free bandwidth has become available, the LAC controller 200 modifies the bandwidth values to adjusted bandwidths in the tunnel/session management table 800 (S222), notifies the relevant private router of changed bandwidth values (S223), and performs step S230.

If a necessary free bandwidth is not available even by adjusting the allocated bandwidths, the LAC controller 200 requests the LNS to increase the bandwidth by designating the tunnel ID (S224) and waits for a response from the LNS (S225). If an increased bandwidth is reallocated by the LNS, the LAC controller 200 performs step 230. If not, the LAC controller 200 notifies the private router 30 that communication is disabled (S226), and exits this routine. If it is found at step 206 that a tunnel through which a new session should be set up does not exist, the LAC controller 200 performs step 230 after the procedure for setting up a tunnel to the LNS 20 (S207).

Figure 19:
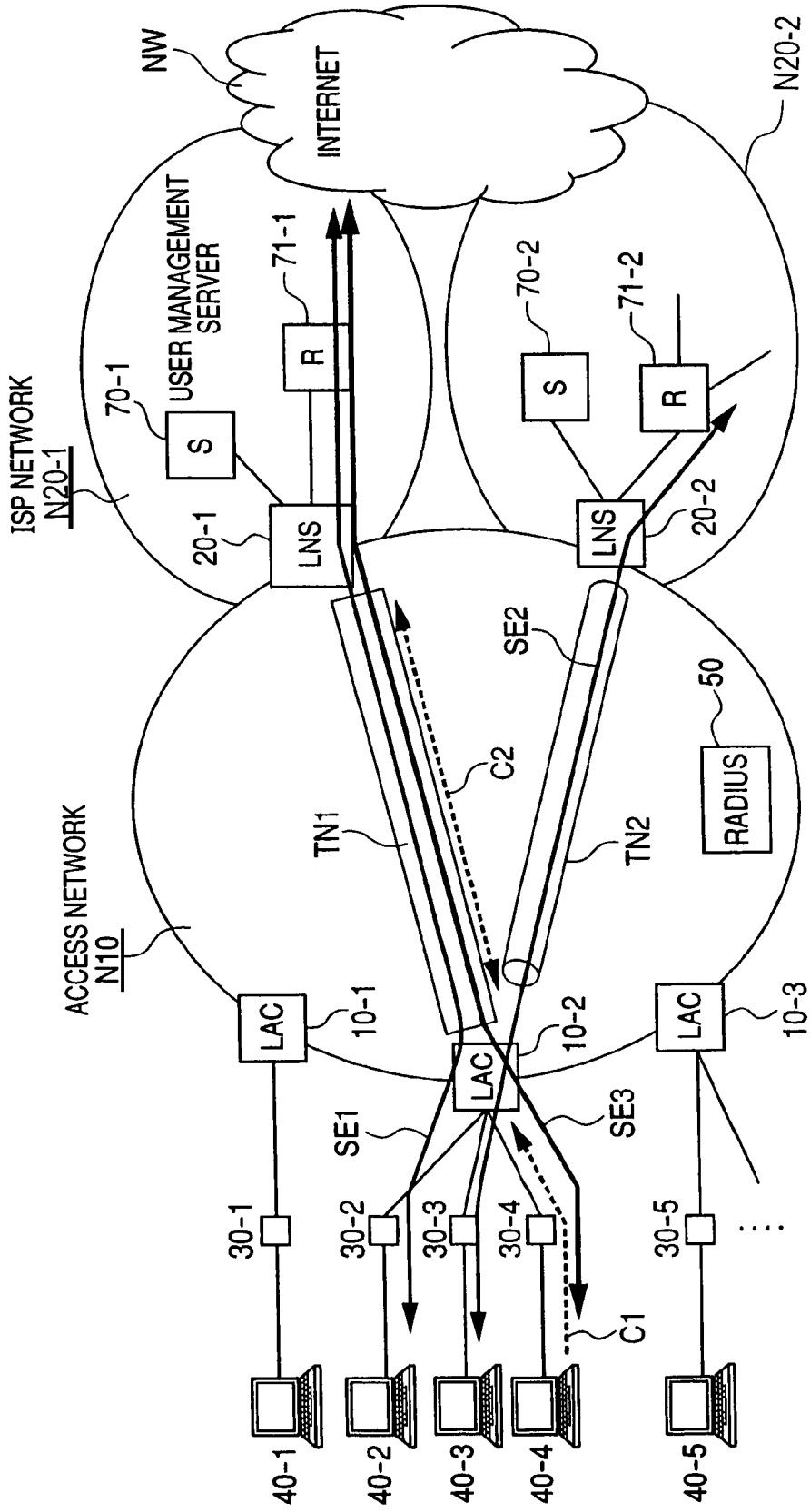
FIG. 19 is a network architecture diagram to explain the third embodiment of communication bandwidth control according to the present invention.

FIG. 19 shows an example of network architecture to explain the third embodiment of communication bandwidth control according to the present invention.

Referring to FIG. 19, the access network N10 includes a LAC 10-1 connected to a private router 30-1, a LAC 10-2 connected to private routers 30-2, 30-3 and 30-4, and a LAC 10-3 connected to a private router 30-5. From the LAC 10-2, a tunnel TN1 to LNS 20-1 and a tunnel TN2 to LNS 20-2 are established.

Here, assume such a situation that, after a session SE1 from a private router 30-2 to an ISP network N20 has been established through the tunnel TN1 and a session SE2 from a private router 30-3 to an ISP network N30 has been established through the tunnel TN2, a request to establish a new session SE3 from a private router 30-4 to the ISP network N20 has now been issued.

The LAC 10-2 checks the bandwidth use status of the tunnel TN1 (transmission bandwidth toward the LNS) by referring to the tunnel/session management table 800. If free bandwidth more than necessary for the session SE3 remains or a necessary free bandwidth is available by performing bandwidth adjustment, the LAC 10-2 establishes the session SE3 in combination with the LNS 20-1. If a sufficient free bandwidth is not available by adjusting the existing bandwidths of sessions in the tunnel TN1, the LAC 10-2 requests the LNS 20-1 to increase the bandwidth allocated to the tunnel TN1 by sending a control packet CN2.

In the procedure for setting up the session SE3, the LNS 20-1 allocates a bandwidth to the new session SE3 by referring to bandwidth use status of the line connected to the ISP network or performs bandwidth reallocation for existing sessions, if necessary. The LNS 20-1 notifies the LAC of the result of the bandwidth allocation. In this case, the bandwidth and priority points are notified to the LAC as bandwidth/priority. Even if communication is judged possible at the LAC side, communication may become disabled depending on the line traffic status at the LNS side. Conversely, even if a sufficient bandwidth is available at the LNS side, a new session may be rejected because of bandwidth shortage at the LAC side. In this embodiment, by associating the network design with the bandwidth/priority allocation policy, efficient operation can be carried out.

Figure 20:
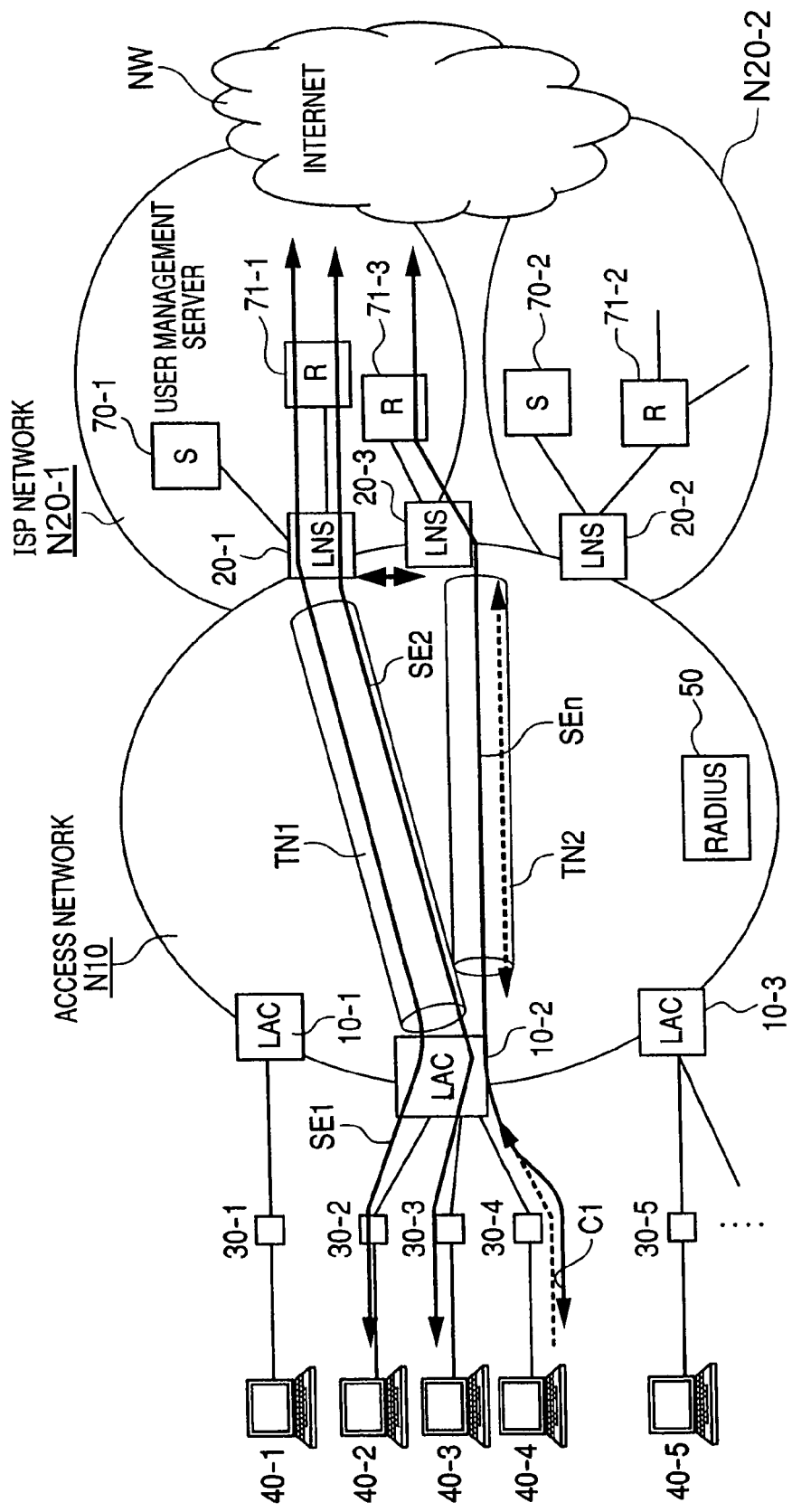
FIG. 20 is another network architecture diagram to explain the third embodiment of communication bandwidth control according to the present invention.

FIG. 20 shows another example of the access network to which the third embodiment is applicable.

In the network architecture shown in FIG. 20, a plurality of LNSs (20-1 and 20-3) is located between the access network N10 and the ISP network N20 to distribute the traffic load of the egress edge node to be a bottleneck. In this case, the RADIUS server 50 defines the LNS 20-1 and the LNS 20-3 as LNSs corresponding to the ISP network NW20. Here, assume such a situation that, after a plurality of sessions (SE1, SE2, etc.) has been established through the tunnel TN1 between the LAC 10-2 and the LNS 20-1, a private router 30-4 has issued a request to set up a new session SEn to the LAC 10-2.

In the case where the bandwidth allocated to the tunnel TN1 has been consumed by the existing sessions and it is impossible to increase the allocated bandwidth by the LNS 20-1, the LAC 10-2 establishes, in response to the request to set up the new session SEn, a new tunnel TN2 to the LNS 20-3 to be used instead of the LNS 20-1 according to LNS information obtained from the RADIUS server 50, and sets up the new session SEn through the new tunnel TN2.

Although the third embodiment allocates maximum bandwidth to each tunnel and multiplexes a plurality of sessions through each tunnel within the limits of maximum bandwidth, without regard to the service type, it may be possible to allocate the maximum bandwidth for each category classified by, for example, user importance, type of service, etc., so that each LAC can control the bandwidth allocation to each session within the limits of maximum bandwidth for each category applicable to a new session.

In the case of bandwidth management on a session-by-session basis, bandwidths in use vary frequently in each tunnel. However, by allocating the maximum bandwidth for each category or for each tunnel and setting up sessions within the maximum bandwidth as described above, it becomes possible to make effective use of the bandwidths of output line of each LNS to be a bottleneck of resources, in accordance with the contents of communication service contract on a user-by-user basis.

Figure 21:
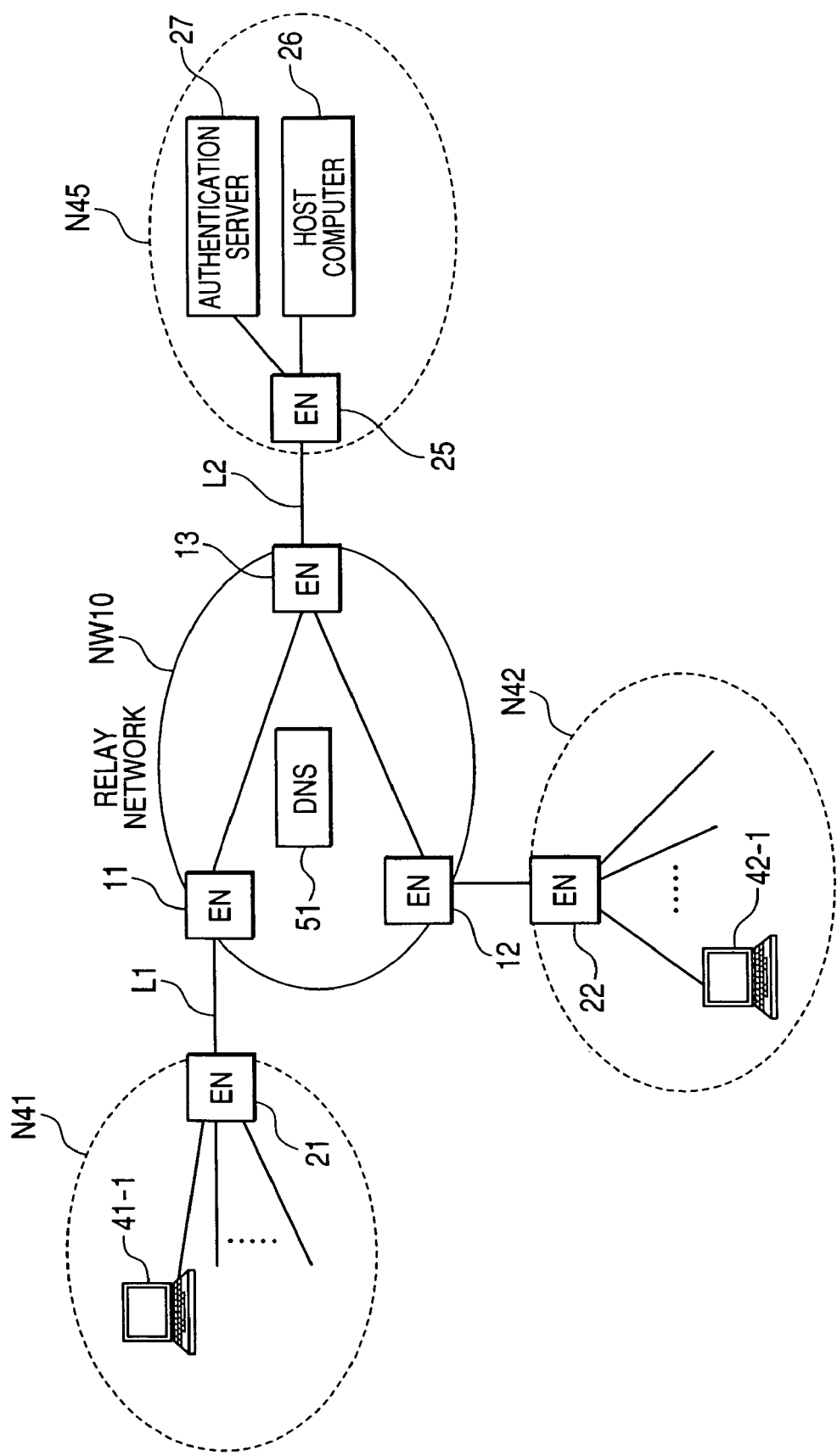
FIG. 21 is a diagram showing a further another network architecture to which communication bandwidth control according to the present invention is applied.

FIG. 21 shows another example of network architecture to which the present invention is applicable.

In the network architecture shown in FIG. 21, a plurality of private networks N41, N42 and N45 is interconnected through a relay network NW10. A private network N45 includes a host computer 26. Terminals connected to private networks N41 and N42 can access the host computer 26 via the relay network NW10. In this case, because traffic from a plurality of terminals concentrates on an edge node 25 to which the host computer 26 is connected, there is the same relation between the edge node 25 and edge nodes 21 and 22 located in other private networks N41 and N42 as the relation between the LNS 20-1 and LACs 10-1, 10-2 and 10-3 shown in FIG. 1.

Here, assume such a situation that an Internet network is used as the relay network NW10 and an IPsec tunnel is formed between the edge nodes (EN) 21 and 25 in order to perform encrypted communication between a terminal 41-1 in the private network N41 as a source network and the host computer 26 in the private network N45 as a destination network. IPsec is used in VPN service for connecting private network via Internet. The edge node 21 of the source network N41 sends a query for destination edge node information to a DNS 51 located in the relay network NW10 in order to know the location of the edge node 25 in the destination network. The DNS 51 may be located in, for example, the source network N41, although it is in the relay network NW1 in this example.

In this embodiment, because the relay network NW is Internet, bandwidth control between the edge nodes 11 and 13 in the relay network cannot be performed freely when a session is set up. However, the same effect as the first embodiment can be obtained in such a manner that the edge node 25 at which the IPsec tunnel terminates sets a bandwidth for each session, according to the bandwidth use status on a line for connecting with the rely network NW10, and notifies the requester edge node 21 (or 22) of the bandwidth setting.

Figure 22:
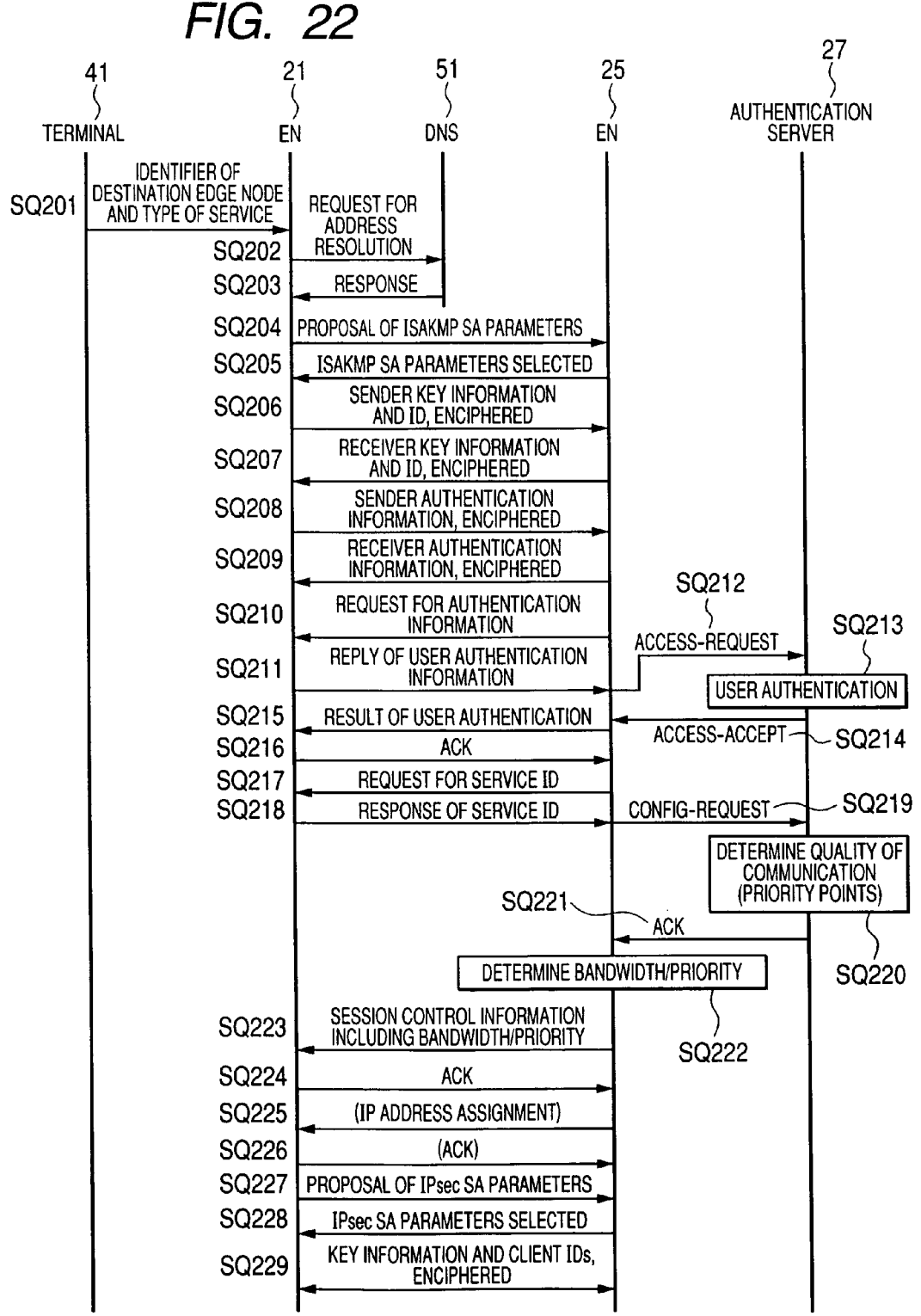
FIG. 22 is a diagram showing an example of communication sequence to be applied to the network architecture shown in FIG. 21.

FIG. 22 shows a diagram illustrating an example of communication sequence according to the present invention, applied to the network architecture shown in FIG. 21.

Prior to communication with the host computer 26, the terminal 41 sends to the source edge node 21 a request packet specifying the identifier of destination edge node 25 and the type of service to be provided (SQ201). The request packet also includes the identifier of the source terminal 41-1 and user authentication information such as user ID and a password.

The source edge node 21 extracts the identifier of destination edge node 25 from the received request packet and obtains connection information such as the address of the destination edge node 25 from the DNS 51 (S202 and SQ203). The source edge node 21 sets up a tunnel to the destination edge node 25 across the relay node, based on the connection information obtained from the DNS 51. Specifically, according to Internet Key Exchange (IKE) phase 1, the source edge node 21 proposes ISAKMP SA parameters (SQ204) and the destination edge node 25 replies receiving-side SA parameters selected (SQ205), thereby Security Association (SA) is carried out. Next, the source edge node 21 sends enciphered sender key information and enciphered sender ID to the destination edge node 25 (SQ206) and, in reply, the destination edge node 25 sends enciphered receiver key information and enciphered receiver ID back to the source edge node 21 (SQ207). Thereby, the source edge node 21 and the destination edge node 25 can share the key information to each other. After that, the source edge node 21 and the destination edge node 25 exchange their authentication information enciphered (SQ208 and SQ209). Thereby, ISAKMP SA is established.

Next, the destination edge node 25 sends a request for authentication information to the source edge node 21 (SQ210) and the source edge node 21 returns user authentication information and service specification (SQ211). The destination edge node 25 sends an Access-request including the received user authentication information to the authentication server 27 (SQ212) and waits for the result of authentication (SQ211). The authentication server 27 checks the validity of the user ID and password specified in the user authentication information (SQ213) and sends an Access-accept message indicating the result of authentication to the edge node 25 (SQ214).

The destination edge node 25 forwards the received authentication result message to the source edge node 21 (SQ215). In reply to this message, the source edge node 21 returns an acknowledge (ACK) message (SQ216). In this embodiment, after that, the destination edge node 25 requests the source edge node 21 to send the type of service (service ID) and the source edge node 21 notifies the destination edge node 25 of the type of service (SQ218). The destination edge node 25 sends to the authentication server 27 a Configuration-request including the type of service received and the user ID known from the user authentication information (SQ219). The authentication server 27 determines priority points to be assigned to the user (session) (SQ220) according to the control policy table, and notifies the destination edge node 25 of the priority information (SQ221), as is the case for the first embodiment.

The destination edge node 25 determines a bandwidth to be allocated to the connection according to the type of service and the priority points (SQ222). The edge node 25 determines the bandwidth by referring to the bandwidth use status of its outgoing line; line L2 in this example. The destination edge node 25 notifies the source edge node 21 of session control information including the bandwidth/priority thus determined and the source edge node 21 returns an acknowledge (ACK) message (SQ224).

If an IP address that is necessary for forwarding user packets across the relay network NW10 is not specified yet, a procedure for IP address assignment (SQ225 and SQ226) is carried out and the process of IPsec setup in IKE phase 2 starts. This IPsec setup corresponds to the setup of individual session through a tunnel. The source edge node 21 proposes IPsec SA parameters to the destination edge node 25 (SQ227) and the destination edge node 25 returns selected IPsec SA parameters to the source edge node 21 (SQ228). Next, by way of ISAKMP SA, the sender key information, sender client ID, and receiver client ID are exchanged with enciphered message (SQ229). Based on the selected parameters, SA is established and communication starts.

Although the third embodiment was described about the case where a bandwidth to be allocated to a session is determined prior to communication when encrypted communication like IPsec is performed, as is the case for the first embodiment, it may be possible to determine a bandwidth to each session after the start of communication, as is the case for the second embodiment.

In the foregoing embodiments, the LAC or source edge node sends the type of service to be offered through the session in response to the request from the LNS or destination edge node, in the case where a bandwidth to be allocated to a session is determined prior to communication. The type of service may be notified to the LNS or destination edge node with a message transmitted from the LAC or source edge node immediately before the above request.

Further, in the relay network NW10 shown in FIG. 21, an IP over IP tunneling for connecting IPv4 and IPv6 networks may also be applicable as a packet forwarding protocol. The present invention can also be applied to packet forwarding using MPLS label switching. In this case, the relay network NW10 is comprised of MPLS routers. The present invention is also applicable to Wide Area Ethernet service in which encapsulated L2 frames are forwarded across the relay network NW10. Protocols to be applied are not limited to those mentioned in the description of the embodiments.

What is claimed is:

1. A packet forwarding apparatus, connected to a plurality of communication nodes through a plurality of tunnels formed on a first network, for communicating packets encapsulated by a tunneling protocol with said communication nodes and forwarding the packets received from the first network to a second network after decapsulating the packets, said packet forwarding apparatus comprising:
- a plurality of input line interface modules connected to input lines from said first or second network;
- a plurality of output line interface modules connected to output lines to said first or second network;
- a controller; and
- a packet forwarding unit for interconnecting said controller, said input line interface modules, and said output line interface modules,
- wherein said controller determines a bandwidth to be allocated to each of sessions multiplexed through a tunnel established between the packet forwarding apparatus and one of said communication nodes according to a type of communication service to be offered to user packets, and notifies the communication node associated with each session of the allocated bandwidth, and
- wherein said controller modifies the bandwidth in accordance with priority points variable depending on a combination of importance points pre-assigned to each user and importance points corresponding to the type of communication service.

2. The packet forwarding apparatus according to claim 1, wherein said controller has a session management table for storing, for each of tunnels formed between the packet forwarding apparatus and said communication nodes, bandwidths allocated to the sessions multiplexed through the tunnel, and determines whether a bandwidth can be allocated to a new session by referring to said session management table.

3. The packet forwarding apparatus according to claim 1, wherein said controller obtains priority information including said priority points determined by a combination of a user identifier of a user terminal having requested a new session and the type of communication service from a user management server with which the controller is connected through a pair of input and output line interface modules connected to said packet forwarding unit, and modifies a minimum assured bandwidth to be allocated to the new session, according to the priority information.

4. The packet forwarding apparatus according to claim 2, wherein said controller obtains priority information including said priority points determined by a combination of a user identifier of a user terminal having requested the new session and the type of communication service from a user management server with which the controller is connected through a pair of input and output line interface modules connected to said packet forwarding unit, and modifies a minimum assured bandwidth to be allocated to the new session, according to the priority information.

5. The packet forwarding apparatus according to claim 2, wherein said controller obtains priority information including said priority points determined in accordance with a combination of a user identifier of a user terminal having requested the new session and the type of communication service from a user management server with which the controller is connected through a pair of input and output line interface modules connected to said packet forwarding unit, stores the priority information in association with a session identifier into said session management table, and procures a necessary free bandwidth to be allocated to the new session, if a free bandwidth on an output line connected with said second network is less than the bandwidth determined according to the type of communication service, by adjusting the bandwidths having been allocated to existing sessions specified in said session management table according to the priority information.

6. The packet forwarding apparatus according to claim 3, wherein said controller notifies the communication node associated with the session of said priority information together with said allocated bandwidth.

7. The packet forwarding apparatus according to claim 4, wherein said controller notifies the communication node associated with the session of said priority information together with said allocated bandwidth.

8. The packet forwarding apparatus according to claim 5, wherein said controller notifies the communication node associated with the session of said priority information together with said allocated bandwidth.

9. The packet forwarding apparatus according to claim 1, wherein said controller determines, when a new session is set up, said bandwidth to be allocated to the new session according to the type of communication service to be offered to user packets, modifies the bandwidth in accordance with said priority points, and notifies the communication node associated with said session of the modified bandwidth, prior to transmission of user packets through the session.

10. The packet forwarding apparatus according to claim 3, wherein said controller obtains, when a new session is set up, the user identifier and the type of communication service from the communication node having transmitted a request for setting up the new session set up and obtains priority information corresponding to the combination of said user identifier and said type of communication service from said user management server, prior to transmission of user packets through the session.

11. The packet forwarding apparatus according to claim 5, wherein said controller obtains, when a new session is set up, the user identifier and the type of communication service from the communication node having transmitted a request for setting up the new session and obtains priority information corresponding to the combination of said user identifier and said type of communication service from said user management server, prior to transmission of user packets through the session.

12. The packet forwarding apparatus according to claim 1, wherein said controller determines, when a first user packet was received through a new session, the bandwidth to be allocated to the new session according to the type of communication service to be offered through the new session, modifies the bandwidth in accordance with said priority points and notifies the communication node associated with the new session of the modified bandwidth.

13. The packet forwarding apparatus according to claim 12, wherein
- each of said input line interface modules connected to said first network comprises means for extracting, when the first user packet was received through the new session, the tunnel identifier, a session identifier, and at least one particular item of header information to identify the type of communication service from a header of the first user packet and notifying said controller of control information indicating a combination of the extracted identifiers and a particular item of header information or a combination of the particular item of header information and a user identifier identified by said tunnel identifier and said session identifier, and
- said controller notifies a user management server, with which the controller is connected through a pair of input and output line interface modules connected to said packet forwarding unit, of the control information received from said input line interface module or the user identifier and the type of service identified by the control information, and obtains said priority information from the user management server.

14. The packet forwarding apparatus according to claim 1, wherein said first network is an access network for connecting user terminals to said second network forming an Internet Service Provider (ISP) network and each of said communication nodes is an access network edge node for connecting a plurality of user terminals to said access network.

15. The packet forwarding apparatus according to claim 1, wherein said first network is a relay network for interconnecting a plurality of private networks, said second network is one of the private networks connected to said first network, and each of said communication nodes is a private network edge node for connecting a plurality of user terminals in the private network to said relay network.

16. A communication bandwidth control method in a communication network including a first communication node connected to a plurality of user terminals via a user network and a plurality of second communication nodes each of which is connected to an Internet Service Provider (ISP) network, said first communication node communicating packets encapsulated by a tunneling protocol with each of said second communication nodes through one of tunnels formed on an access network, said one of the tunnels being established between the first communication node and said each second communication node, the method comprising the steps of:

with each of said second communication nodes determining a maximum bandwidth available for said one of the tunnels established between the first communication node and said each second communication node according to the bandwidth of a communication line connected to said ISP network and notifying the first communication node of the maximum bandwidth of the tunnel;

requesting from one of said user terminals to said first communication node a new session to be connected to one of said second communication nodes;

with said first communication node, allocating a bandwidth to each the new session multiplexed through one of the tunnels within the limits of the maximum bandwidth; and controlling user packets for each session based on the allocated bandwidth by said first communication node, wherein said first communication node determines the bandwidth to be allocated to the new session according to a type of communication service to be offered to user packets and modifies the bandwidth in accordance with priority points variable depending on a combination of importance points pre-assigned to each user and importance points corresponding to the type of communication service.

17. The communication bandwidth control method according to claim 16, wherein said first communication node is provided with a management table comprising a plurality of entries, each of which includes, in association with the tunnel identifier, a maximum bandwidth of a tunnel allocated by the second communication node and a plurality of session information records each indicating a session identifier, the type of communication service, the priority points, and a bandwidth allocated to each session, and said first communication node allocates the bandwidth to the new session according to the type of communication service to be offered to user packets and the priority points, by referring to said management table.

18. The communication bandwidth control method according to claim 16, wherein each of said second communication nodes obtains priority information including the priority points determined in accordance with a combination of a user identifier of a user terminal having requested the new session and the type of communication service from a user management server located in the ISP network and notifies said first communication node of the priority information, and said first communication node modifies the bandwidth to be allocated to the new session according to the priority information notified from said second communication node.

19. The communication bandwidth control method according to claim 17, wherein each of said second communication nodes obtains priority information including the priority points determined in accordance with a combination of user identifier of a user terminal having requested said new session and the type of communication service for each session from a user management server located in the ISP network and notifies said first communication node of the priority information, and said first communication node modifies a bandwidth to be allocated to the new session according to the priority information notified from said second communication node.

20. The communication bandwidth control method according to claim 17, wherein each of said second communication nodes obtains priority information including the priority points determined in accordance with a combination of user identifier of a user terminal having requested the new session and the type of communication service from a user management server located in the ISP network and notifies said first communication node of the priority information, and said first communication node stores the priority information notified from said second communication node into said management table in association with a session identifier and procures a necessary free bandwidth to be allocated to the new session if a free bandwidth of the tunnel is less than the necessary bandwidth by adjusting the bandwidths having been allocated to the existing sessions specified in said management table according to the priority information.

* * * * *

UNITED STATES PATENT AND TRADEMARK OFFICE
CERTIFICATE OF CORRECTION

PATENT NO. : 7,649,890 B2  Page 1 of 1
APPLICATION NO. : 11/211589
DATED : January 19, 2010
INVENTOR(S) : Mizutani et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1089 days.

Signed and Sealed this

Twenty-third Day of November, 2010

David J. Kappos
*Director of the United States Patent and Trademark Office*